(12) United States Patent
Wilce et al.

(10) Patent No.: US 7,231,362 B2
(45) Date of Patent: Jun. 12, 2007

(54) SYSTEMS AND METHODS FOR FACILITATING USE OF AGREEMENT INFORMATION VIA AN AGREEMENT MODELING SYSTEM

(75) Inventors: Scot D. Wilce, Morristown, NJ (US); Vincent A. George, Edgewater, NJ (US); Hien Q. Nguyen, Jersey City, NJ (US); Donna L. Conti, Cream Ridge, NJ (US); Patrick E. Harris, New York, NY (US); Donna M. Mansfield, Port Washington, NY (US)

(73) Assignee: Goldman Sachs & Co., New York, NY (US)

( * ) Notice: Subject to any disclaimer, the term of this patent is extended or adjusted under 35 U.S.C. 154(b) by 1032 days.

(21) Appl. No.: 09/939,911

(22) Filed: Aug. 27, 2001

(65) Prior Publication Data

US 2003/0023528 A1    Jan. 30, 2003

Related U.S. Application Data

(63) Continuation-in-part of application No. 09/916,881, filed on Jul. 27, 2001.

(51) Int. Cl.
*G06Q 40/00* (2006.01)
(52) U.S. Cl. .................. 705/35; 707/3; 707/4; 707/5
(58) Field of Classification Search .............. 705/35, 705/3, 4, 5
See application file for complete search history.

(56) References Cited

U.S. PATENT DOCUMENTS 5,692,206 A * 11/1997 Shirley et al. ............. 715/531

| 5,826,244 | A | * | 10/1998 | Huberman | ............ 705/37 |
|---|---|---|---|---|---|
| 5,970,479 | A | | 10/1999 | Shepherd | |
| 6,067,531 | A | | 5/2000 | Hoyt et al. | |

(Continued)

FOREIGN PATENT DOCUMENTS

| WO | WO 96/21903 A1 | 7/1996 |
|---|---|---|
| WO | WO 01/75745 A1 | 10/2001 |
| WO | WO 02/10935 A1 | 2/2002 |

OTHER PUBLICATIONS

Drabik, R.C. RB&W Negotiating Loan Agreement to Cure Default. Business Wire, New York. Jan. 30, 1992. Sec. 1, p. 1. (2 pages).*

(Continued)

*Primary Examiner*—Richard E. Chilcot, Jr.
*Assistant Examiner*—Jennifer Liversedge
(74) *Attorney, Agent, or Firm*—Buckley, Maschoff & Talwalkar LLC

(57) ABSTRACT

Systems and methods are provided to facilitate use of agreement information via an agreement modeling system. According to one embodiment, transaction information is evaluated based on agreement information stored in the agreement modeling system. According to another embodiment, an applicability of an agreement term may be determined based on agreement information, such as an expiration date associated with the agreement term. According to another embodiment, a user's access to agreement information is controlled by security information, such as a security class or attribute. According to another embodiment, multiple users may access agreement information in accordance with a concurrency management process.

22 Claims, 28 Drawing Sheets

U.S. PATENT DOCUMENTS

| | | | |
|---|---|---|---|
| 6,125,391 | A | 9/2000 | Meltzer et al. |
| 6,236,984 | B1 | 5/2001 | Owens et al. |
| 6,421,653 | B1 | 7/2002 | May |
| 6,778,968 | B1 | 8/2004 | Gulati |
| 2002/0010686 | A1* | 1/2002 | Whitesage .................. 705/80 |
| 2002/0023034 | A1 | 2/2002 | Brown et al. |
| 2002/0038278 | A1 | 3/2002 | Himmelstein |
| 2002/0042782 | A1 | 4/2002 | Albazz et al. |
| 2002/0087534 | A1 | 7/2002 | Blackman et al. |
| 2002/0095311 | A1 | 7/2002 | Donahue |
| 2002/0111922 | A1 | 8/2002 | Young et al. |
| 2002/0198817 | A1 | 12/2002 | Dhir |
| 2003/0172006 | A1* | 9/2003 | Fino et al. .................... 705/27 |
| 2004/0010463 | A1 | 1/2004 | Hahn-Carlson et al. |

OTHER PUBLICATIONS

Business Wire. Internet Library Enables Users to Surf the Web's Past; Group Adds Dimension of Time to the Internet by Developing a Collection of Election 2000 Web Sites. New York: Jun. 18, 2001. (3 pages).*

"Cross-Product Master Agreement," Feb. 2002, The Bond Market Association (Feb. 2000).

"Cross-Product Master Agreement Guidance Notes," Feb. 2000, The Bond Market Association (Feb. 2000).

"PCT Notification of Transmittal of the International Search Report or the Declaration", dated Apr. 22, 2004 for PCT/US02/23898, 5pgs.

"PCT Notification of Transmittal of the International Search Report or the Declaration", dated Mar. 8, 2004 for PCT/US02/23896, 4 pgs.

* cited by examiner

1100

| AGREEMENT INFORMATION IDENTIFIER 1102 | INFORMATION TYPE 1104 | ENTRY DATE 1106 | EFFECTIVE DATE 1108 | EXPIRATION DATE 1110 |
|---|---|---|---|---|
| A101 | MASTER AGREEMENT (ISDA_1.0) | 5/5/02 | 5/5/02 | NONE |
| A101-01 | AMENDMENT | 7/5/02 | 6/10/02 | 6/10/03 |
| A101-02 | AMENDMENT | 8/5/02 | 10/1/02 | NONE |
| A102 | MASTER AGREEMENT (OTC_2.2) | 11/1/02 | 3/1/02 | 9/1/02 |

| DOCUMENT NUMBER | DOCUMENT TYPE | DOCUMENT STATUS | EFFECTIVE DATE |
|---|---|---|---|
| 123 | ORIGINAL AGREEMENT | EXECUTED 01/01/1998 | 01/01/1998 |
| 124 | AMENDMENT #1 | EXECUTED 06/15/1998 | 06/15/1998 |
| 125 | AMENDMENT #2 | EXECUTED 03/01/1999 | 01/01/1998 |

1404

| DOCUMENT NUMBER | EFFECTIVE DATE | FACT | FACT VALUE | EXPIRATION DATE |
|---|---|---|---|---|
| 123 | 01/01/1998 | A | YES | |
| 123 | 01/01/1998 | B | NO | 06/15/1998 (124) |
| 123 | 01/01/1998 | C | UNKNOWN | 06/15/1998 (124) |
| 123 | 01/01/1998 | D | 1000 | |
| 123 | 01/01/1998 | E | YES | 01/01/1998 (125) |
| 124 | 06/15/1998 | B | YES | |
| 124 | 06/15/1998 | C | NO | |
| 125 | 01/01/1998 | E | NO | |

1406

TIME PERSPECTIVE FROM 3/2/99

| | 01/01/1998 → | 06/15/1998 → | 03/01/1999 |
|---|---|---|---|
| A | YES | YES (123) | YES (123) |
| B | NO | YES (124) | YES (124) |
| C | UNKNOWN | NO (124) | NO (124) |
| D | 1000 | 1000 (123) | 1000 (123) |
| E | NO (125) | NO (125) | NO (125) |

FIG. 14

|  |  |  | SWAPS | OPTIONS | | | |
|---|---|---|---|---|---|---|---|
|  |  |  |  | BUY | | SELL | |
|  |  |  |  | CALL | PUT | OTHER | CALL | PUT | OTHER |
| EQUITY | STOCK |  |  |  |  |  |  |  |  |
|  | INDEX |  |  |  |  |  |  |  |  |
| FIXED INCOME | BONDS |  |  |  |  |  |  |  |  |
|  | INDEX |  |  |  |  |  |  |  |  |
|  | BANK NOTES |  |  |  |  |  |  |  |  |
|  | WHOLE LOANS |  |  |  |  |  |  |  |  |
| COMMODITIES | METALS | PRECIOUS | GOLD |  |  |  |  |  |  |
|  |  |  | SILVER | Y |  |  |  |  |  |
|  |  | RARE | COPPER |  |  |  |  | Y |  |
|  |  |  | NICKEL |  |  |  |  |  |  |
|  | ENERGY |  | NATURAL GAS |  |  |  |  |  |  |
|  |  |  | CRUDE OIL |  |  |  |  |  |  |
|  |  |  | REFINED PRODUCTS |  |  |  |  |  |  |
|  |  |  | ELECTRICITY |  |  |  |  |  |  |

FIG. 16

| | | | | SWAPS | OPTIONS | | | | | |
|---|---|---|---|---|---|---|---|---|---|---|
| | | | | | BUY | | | SELL | | |
| | | | | | CALL | PUT | OTHER | CALL | PUT | OTHER |
| EQUITY | STOCK | | | | | | | | | |
| | INDEX | | | | | | | | | |
| FIXED INCOME | BONDS | | | | | | | | | |
| | INDEX | | | | | | | | | |
| | BANK NOTES | | | | | | | | | |
| | WHOLE LOANS | | | | | | | | | |
| COMMODITIES | METALS | PRECIOUS | GOLD | Y | | | | | | |
| | | | SILVER | Y | | | | | | |
| | | RARE | COPPER | Y | | | | | | |
| | | | NICKEL | Y | | | | | | |
| | ENERGY | | NATURAL GAS | | | | | Y | | |
| | | | CRUDE OIL | | | | | Y | | |
| | | | REFINED PRODUCTS | | | | | Y | | |
| | | | ELECTRICITY | | | | | Y | | |

FIG. 17

| SECURITY CLASSES | FUNCTIONAL AREA OWNERSHIP | | | | |
|---|---|---|---|---|---|
| | LEGAL | COMPLIANCE | CREDIT | EIG | TREASURY |
| LEGAL_PUBLIC | T | | | | |
| LEGAL_PRIVATE | T | | | | |
| LEGAL_CONFIDENTIAL | T | | | | |
| CREDIT_PUBLIC | | | T | | |
| CREDIT_PRIVATE | | | T | | |
| CREDIT_CONFIDENTIAL | | | T | | |
| DMG_PUBLIC | | | | | |
| DMG_PRIVATE | | | | | |
| DMG_CONFIDENTIAL | | | | | |
| SYSTEM_PUBLIC | | | | | |
| SYSTEM_PRIVATE | | | | | |
| SYSTEM_CONFIDENTIAL | | | | | |

FIG. 19A

| FUNCTIONAL AREA OWNERSHIP (CONT.) | | | | ACCESS SCOPE |
|---|---|---|---|---|
| OPERATIONS | BUSINESS DESK | DMG | AGREEMENT MODELING SYSTEM | |
| | | T | T | PUBLIC |
| | | | T | PRIVATE |
| | | | T | CONFIDENTIAL |
| | | T | T | PUBLIC |
| | | | T | PRIVATE |
| | | | T | CONFIDENTIAL |
| | | T | T | PUBLIC |
| | | T | T | PRIVATE |
| | | T | T | CONFIDENTIAL |
| | | | T | PUBLIC |
| | | | T | PRIVATE |
| | | | T | CONFIDENTIAL |

FIG. 19B

| SECURITY GROUPS | FUNCTIONAL AREA ACCESS MODE | | | | | |
|---|---|---|---|---|---|---|
| | LEGAL | COMPLIANCE | CREDIT | EIG | TREASURY | |
| LEGAL_ADMIN | 3 3 3 | 2 | 2 | 2 | 2 | |
| LEGAL_USER | 3 3 1 | 2 | 2 | 2 | 2 | |
| CREDIT_ADMIN | 2 | 2 | 3 3 3 | 2 | 2 | |
| CREDIT_USER | 2 | 2 | 3 3 1 | 2 | 2 | |
| DMG_ADMIN | 3 2 1 | 3 2 1 | 3 2 1 | 3 2 1 | 3 2 1 | |
| DMG_USER | 3 2 | 3 2 | 3 2 | 3 2 | 3 2 | |
| SYSTEM_ADMIN | 3 3 3 | 3 3 3 | 3 3 3 | 3 3 3 | 3 3 3 | |

FIG. 20A

| FUNCTIONAL AREA ACCESS MODE (CONT.) | | | | ACCESS SCOPE |
|---|---|---|---|---|
| OPERATIONS | BUSINESS DESK | DMG | SYSTEM | |
| 2 | 2 | 2 | 2 | PUBLIC PRIVATE CONFIDENTIAL |
| 2 | 2 | 2 | 2 | PUBLIC PRIVATE CONFIDENTIAL |
| 2 | 2 | 2 | 2 | PUBLIC PRIVATE CONFIDENTIAL |
| 2 | 2 | 2 | 2 | PUBLIC PRIVATE CONFIDENTIAL |
| 3 2 1 | 3 2 1 | 3 3 3 | 2 | PUBLIC PRIVATE CONFIDENTIAL |
| 3 2 | 3 2 | 3 3 1 | 2 | PUBLIC PRIVATE CONFIDENTIAL |
| 3 3 3 | 3 3 3 | 3 3 3 | 3 3 3 | PUBLIC PRIVATE CONFIDENTIAL |

FIG. 20B

| SECURITY GROUPS | DONNA MANSFIELD | LINDA TROCCHIO | STEVE KIRCHER | PHAVIE LANG | MIKE KOKOLAS | VINCE GEORGE |
|---|---|---|---|---|---|---|
| LEGAL_ADMIN | T | | | | | |
| LEGAL_USER | T | T | | | | |
| CREDIT_ADMIN | | | | | T | |
| CREDIT_USER | | | T | | T | |
| DMG_ADMIN | | | T | | | |
| DMG_USER | | | | T | | |
| SYSTEM_ADMIN | | | | | | T |

FIG. 21

| SECURITY CLASSES | DONNA MANSFIELD | LINDA TROCCHIO | STEVE KIRCHER | PHAVIE LANG | MIKE KOKOLAS | VINCE GEORGE |
|---|---|---|---|---|---|---|
| LEGAL_PUBLIC | 3 | 3 | 3 | 3 | 2 | 3 |
| LEGAL_PRIVATE | 3 | 2 | 2 | 2 | 0 | 3 |
| LEGAL_CONFIDENTIAL | 3 | 1 | 1 | 1 | 0 | 3 |
| CREDIT_PUBLIC | 2 | 2 | 3 | 2 | 3 | 3 |
| CREDIT_PRIVATE | 0 | 0 | 2 | 0 | 3 | 3 |
| CREDIT_CONFIDENTIAL | 0 | 0 | 1 | 0 | 3 | 3 |
| DMG_PUBLIC | 2 | 2 | 3 | 2 | 2 | 3 |
| DMG_PRIVATE | 0 | 0 | 3 | 0 | 0 | 3 |
| DMG_CONFIDENTIAL | 0 | 0 | 3 | 0 | 0 | 3 |
| SYSTEM_PUBLIC | 2 | 2 | 2 | 2 | 2 | 3 |
| SYSTEM_PRIVATE | 0 | 0 | 0 | 0 | 0 | 3 |
| SYSTEM_CONFIDENTIAL | 0 | 0 | 0 | 0 | 0 | 3 |

FIG. 22

SYSTEMS AND METHODS FOR FACILITATING USE OF AGREEMENT INFORMATION VIA AN AGREEMENT MODELING SYSTEM

CROSS-REFERENCE TO RELATED APPLICATIONS

The present invention is a continuation-in-part of: U.S. patent application Ser. No. 09/916,881 entitled "Systems and Methods for Facilitating Agreement Definition via an Agreement Modeling System" filed on Jul. 27, 2001; and U.S. patent application Ser. No. 09/929,184 entitled "Systems and Methods for Facilitating Agreement Generation and Negotiation via an Agreement Modeling System" filed on Aug. 14, 2001. The entire contents of these applications are incorporated herein by reference.

FIELD

The present invention relates to agreements between parties. In particular, the present invention relates to systems and methods to facilitate use of agreement information via an agreement modeling system.

BACKGROUND

Typically, an agreement between a party and a counter-party is manually defined and generated by the parties. That is, one or both of the parties manually select a type of document that appropriately reflects the substance of the agreement (e.g., a particular type of contract) and/or agreement terms to be included in the document (e.g., contract clauses). In addition, an existing agreement needs to be manually reviewed by the parties to determine the terms of the agreement (e.g., to determine whether or not a potential transaction is covered by the existing agreement). Such manual approaches, however, have a number of disadvantages.

For example, the manual definition of an agreement can be a time consuming and error-prone process, especially when a large number of potential document types and/or potential agreement terms can be associated with the agreement. Similarly, particular parties or localities may require different document types and/or agreement terms. As a result, the parties must carefully consider the substance of the agreement in order to select the appropriate document type and/or agreement terms.

Consider, for example, a transaction agreement associated with a number of different financial instruments (e.g., swaps and options) and financial products (e.g., equities and commodities). In this case, different combinations of financial instruments and financial products may call for different document types and/or agreement terms. Moreover, several different entities within a party (e.g., a bank's taxation department and legal department) may need to provide input to the process. Determining the current status of an agreement via a manual review of an existing agreement documents (e.g., a master contract and a number of contract amendments) poses similar problems and risks.

It is known that some elements of an agreement process can be automated. For example, U.S. Pat. No. 5,692,206 entitled "Method and Apparatus for Automating the Generation of a Legal Instrument" discloses a system that automates the generation of various legal documents related to a negotiated agreement. Even this approach, however, does not address the potentially dynamic relationships that may exist between a party and a counter-party. For example, an agreement may be frequently amended to reflect new financial products or credit limits, and these amendments may be inter-related or retroactive. Such amendments are typically created as separate documents, making it difficult to ascertain the current status of an agreement, let alone the status of the agreement on a particular date in the past.

Moreover, known systems rely on hard-coded rules, programs, and architectures to facilitate the definition, generation, and/or use of agreement information. Often, however, agreements are flexible (e.g., a new contract clause may suddenly become applicable to many different document types). In addition, the kinds of documents and contract terms that should be used for a particular agreement (or a way in which existing terms will be interpreted) can change over time. Because known systems are hard-coded, they may be unable to efficiently handle the fluid environments in which many agreements are made, changed, and used. For example, a conventional database approach in which information is stored in pre-defined tables and columns may not be an effective, long-term approach to agreement modeling.

SUMMARY

To alleviate problems inherent in the prior art, the present invention introduces systems and methods to facilitate use of agreement information via an agreement modeling system.

According to one embodiment, transaction information associated with a transaction is received, and agreement information is determined via an agreement modeling system. The transaction information and the agreement information are then evaluated, and an indication is generated based on the evaluation.

According to another embodiment, financial transaction information indicating a financial product, a financial instrument, and/or a monetary amount is received. Agreement information associated with a covered products matrix is then determined via an agreement modeling system. The financial transaction information and the agreement information are evaluated, and an indication of approval is transmitted to a user and/or a satellite system based on the evaluation.

According to another embodiment, an indication of an agreement between a party and a counter-party is received. According to this embodiment, the agreement includes an agreement term associated with a term date. An indication of a query date is also received, and an applicability of the agreement term on the query date is determined based on the term date (i.e., based at least in part on the term date).

According to another embodiment, a request to access agreement information is received. It is then determined if the request will be approved based on security information associated with the agreement information. If the request is approved, access to the agreement information is enabled.

According to another embodiment, it is arranged for a first user to access agreement information. A request to access the agreement information is received from a second user, but the second user is prevented from accessing the agreement information based on the first user's access.

According to still another embodiment, a request to amend an existing transaction agreement between a party and a counter-party is received. An adjustment to a set of financial products, a set of financial instruments, a monetary amount, and/or an agreement date is then determined. In addition, adjusted agreement information is automatically determined in accordance with the adjustment.

According to yet another embodiment, agreement information is received from a first user, and an agreement document is generated in accordance with the agreement information. Transaction information is then received (e.g., from a second user or a satellite system) and evaluated based on the agreement information.

One embodiment comprises: means for receiving transaction information associated with a transaction; means for determining agreement information via an agreement modeling system; means for evaluating the transaction information and the agreement information; and means for generating an indication based on said evaluating.

Another embodiment comprises: means for receiving financial transaction information, the financial transaction information indicating at least one of: (i) a financial product, (ii) a financial instrument, and (iii) a monetary amount; means for determining agreement information associated with a covered products matrix via an agreement modeling system; means for evaluating the financial transaction information and the agreement information; and means for transmitting an indication of approval to at least one of: (i) a user, and (ii) a satellite system based on said evaluating.

Another embodiment comprises: means for receiving an indication of an agreement between a party and a counter-party, the agreement including an agreement term associated with a term date; means for receiving an indication of a query date; and means for determining an applicability of the agreement term on the query date based on the term date.

Another embodiment comprises: means for receiving a request to access agreement information associated with an agreement between a party and a counter-party; means for determining if the request will be approved based on security information associated with the agreement information; and means for enabling access to the agreement information if the request is approved.

Another embodiment comprises: means for arranging for a first user to access agreement information associated with an agreement between a party and a counter-party; means for receiving from a second user a request to access the agreement information; and means for preventing the second user from accessing the agreement information based on the first user's access.

Still another embodiment comprises: means for receiving a request to amend an existing transaction agreement between a party and a counter-party; means for determining an adjustment to at least one of (i) a set of financial products, (ii) a set of financial instruments, (iii) a monetary amount, and (iv) an agreement date; and means for automatically determining adjusted agreement information in accordance with the adjustment.

Yet another embodiment comprises: means for receiving agreement information from a first user; means for generating an agreement document in accordance with the agreement information; means for receiving transaction information; and means for evaluating the transaction information based on the agreement information.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 11 is a tabular representation of a portion of an agreement information database according to an embodiment of the present invention.

FIG. 14 is an agreement time perspective display according to some embodiments of the present invention.

FIG. 16 illustrates an example of a covered products matrix according to an embodiment of the present invention.

FIG. 17 illustrates another example of a covered products matrix according to an embodiment of the present invention.

FIGS. 19A and 19B are a security class attribute table according to an embodiment of the present invention.

FIGS. 20A and 20B are a security group attribute table according to an embodiment of the present invention.

FIG. 21 is a security user group membership table according to an embodiment of the present invention.

FIG. 22 is a security user computed-access (per security class) table according to an embodiment of the present invention.

DETAILED DESCRIPTION

Embodiments of the present invention are associated with systems and methods to facilitate use of information associated with an "agreement." As used herein, the term "agreement" may refer to any arrangement between the parties. An agreement may be, for example, a legal contract defining a set of rights that exist between the parties, such as an INTERNATIONAL SWAP DEALERS ASSOCIATION® (ISDA®) master agreement associated with financial instruments and products. Note that a single agreement may be associated with more than two parties (e.g., three parties may enter into a legal contract). Also note that an agreement may or may not be legally binding (e.g., an agreement may simply reflect an informal understanding between parties).

In addition, as used herein the terms "party" and "counter-party" can refer to any entity associated with an agreement. A party may be, for example, a business, a business entity (e.g., a department within a business), or a person.

Agreement Modeling System Overview

Figure 1:
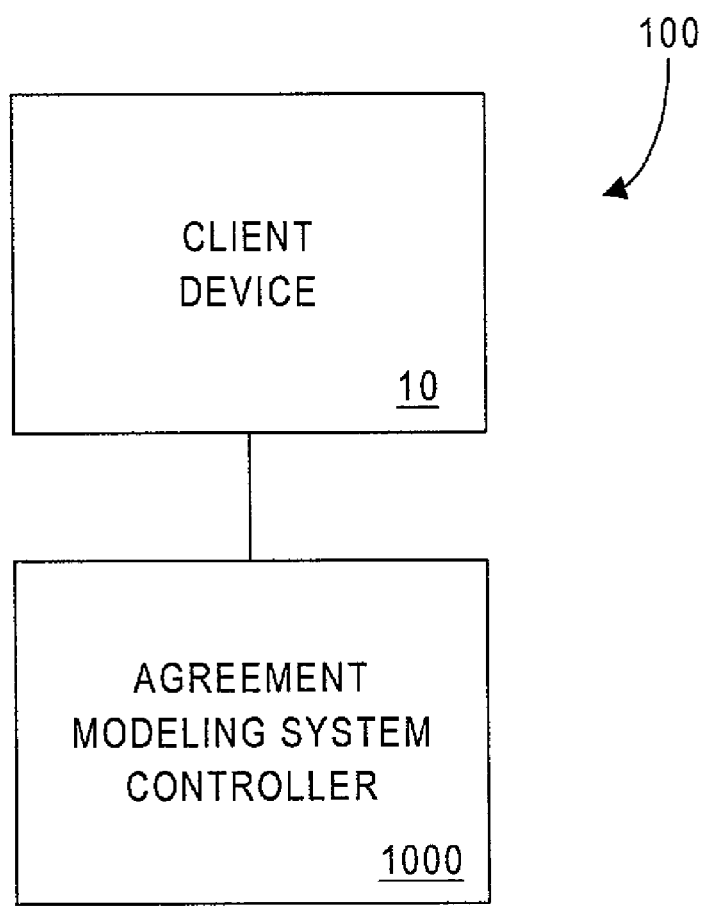
FIG. 1 is a block diagram overview of an agreement modeling system according to an embodiment of the present invention.

Turning now in detail to the drawings, FIG. 1 is a block diagram of an agreement modeling system 100 according to an embodiment of the present invention. As shown in FIG. 1, an agreement modeling system controller 1000 may interact with a client device 10. For example, a user may input information associated with a transaction agreement via the client device 10. The client device 10 may then transmit appropriate information to the agreement modeling system controller 1000, which in turn may store and/or interpret the information. Similarly, a user may request information about an agreement via the client device 10 (e.g., by performing a query associated with a transaction agreement).

Figure 2:
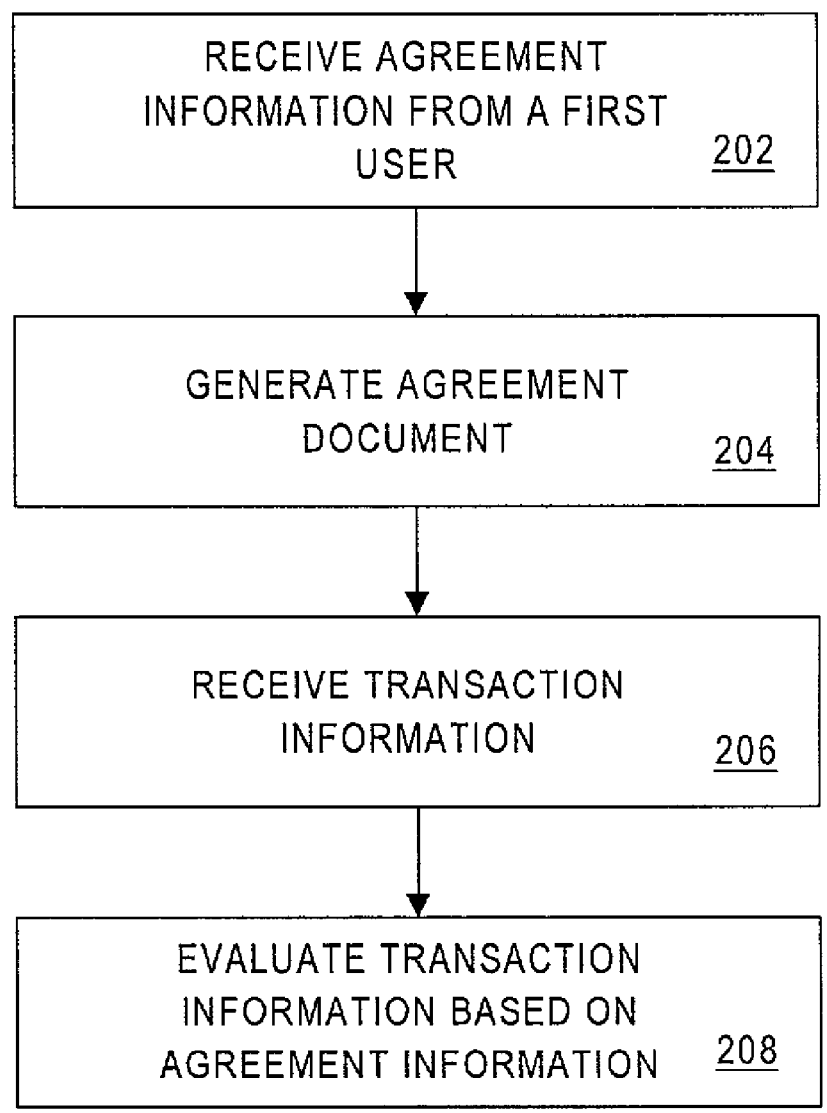
FIG. 2 is a flow chart of a method according to some embodiments of the present invention.

FIG. 2 is a flow chart of a method according to some embodiments of the present invention. The flow charts in FIG. 2 and the other figures described herein do not imply a fixed order to the steps, and embodiments of the present invention can be practiced in any order that is practicable. The method shown in FIG. 2 may be performed, for example, by the agreement modeling system controller 1000.

At 202, agreement information is received from a first user. For example, the first user may input information via the client device 10 indicating one or more financial products that will be associated with a contract. The agreement modeling system controller 1000 may then determine an appropriate contract type based on those financial products.

At 204, one or more agreement documents are generated in accordance with the agreement information. For example, the agreement modeling system controller 1000 may generate a master agreement including one or more appropriate contract terms (e.g., a contract clause or a credit limit to be associated with a particular financial product).

At 206, transaction information is received. For example, a second user (or any other party or device) may transmit information about a transaction to the agreement modeling system controller 1000 (e.g., information about a pending or completed transaction).

At 208, the transaction information is evaluated based on the agreement information. For example, the agreement modeling system controller 1000 may determine if a proposed transaction falls within the scope of an existing agreement. According to one embodiment, the agreement modeling system controller 1000 also transmits an indication (e.g., to the second user) based on the evaluation. For example, a message stating that a proposed transaction is not covered by any existing agreement may be transmitted to a legal entity.

Agreement Modeling System Architecture

Figure 3:
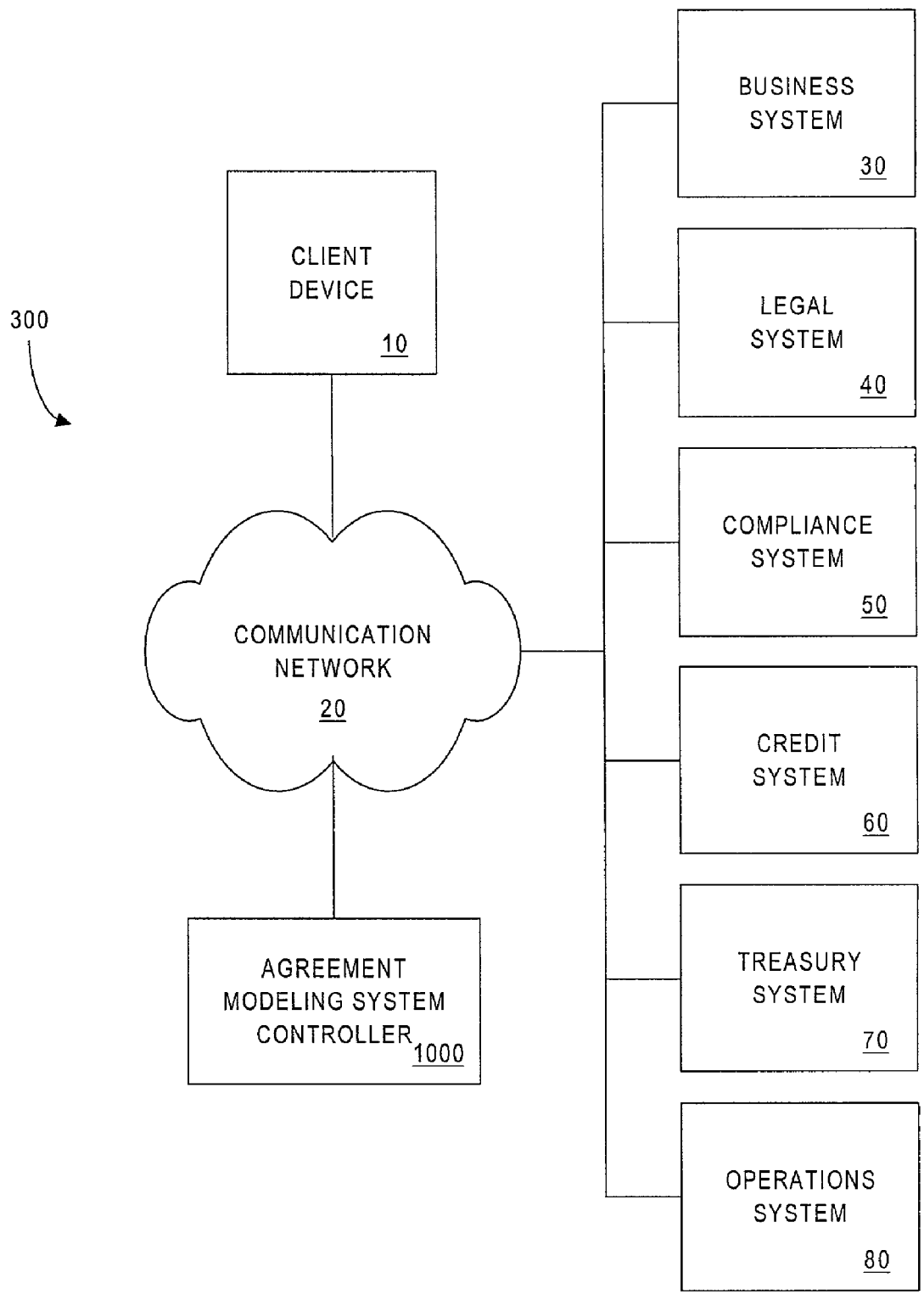
FIG. 3 is a block diagram overview of an agreement modeling system according to another embodiment of the present invention.

FIG. 3 is a block diagram overview of an agreement modeling system 300 according to another embodiment of the present invention. As in FIG. 1, the agreement modeling system controller 1000 communicates with the client device 10. As used herein, devices (such as the agreement modeling system controller 1000 and the client device 10) may communicate via a communication network 20, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communications" can refer to wired and/or wireless communications as appropriate. Note that the devices shown in FIG. 3 need not be in constant communication. For example, the agreement modeling system controller 1000 may communicate with a client device 10 on an as-needed or periodic basis.

Although a single agreement modeling system controller 1000 is shown in FIG. 3, any number of agreement modeling system controllers 1000 may be included in the agreement modeling system 300. Similarly, any number of client devices 10, or any other device described herein, may be included in the agreement modeling system 300 according to embodiments of the present invention.

The agreement modeling system controller 1000 and the client devices 10 may be any devices capable of performing the various functions described herein. A client device 10 may be, for example: a Personal Computer (PC), a portable computing device (e.g., a laptop computer), a Personal Digital Assistant (PDA), or a dedicated agreement modeling system 300 terminal. Note that the client device 10 may be associated with a full-blown workstation application or a thin-client browser-based application.

According one embodiment, a user enters information associated with an agreement via the client device 10. The agreement may be, for example, associated with financial transactions between a party and a counter-party. In this case, the user may enter information about the party, the counter-party, and/or the financial transactions via the client device 10 (e.g., by selecting a number of different financial instruments that will be involved in transactions between the parties).

Information associated with the agreement may then be transmitted from the client device 10 to the agreement modeling system controller 1000 via the communication network 20, and the agreement modeling system controller 1000 may process the information to facilitate definition of the agreement. According to one embodiment, the agreement modeling system 1000 also communicates with one or more satellite systems, such as a business system 30, a legal system 40, a compliance system 50, a credit system 60, a treasury system 70, and/or an operations system 80 to facilitate definition of the agreement. For example, the agreement modeling system controller 1000 may review information provided by the user and determine that the agreement requires approval via a credit system 60. Note that the agreement modeling system controller 1000 may communicate with the client device 10 and one or more satellite systems via a single communication network or via different communication networks.

After the agreement is defined, a user (or one of the satellite systems) may query the agreement modeling system controller 1000 about the agreement. For example, the business system 30 may query the agreement modeling system controller 1000 to determine if a proposed transaction is covered by an agreement that was previously defined. Moreover, a user may amend an existing agreement (e.g., by transmitting an adjusted set of financial products from the client device 10).

Figure 4:
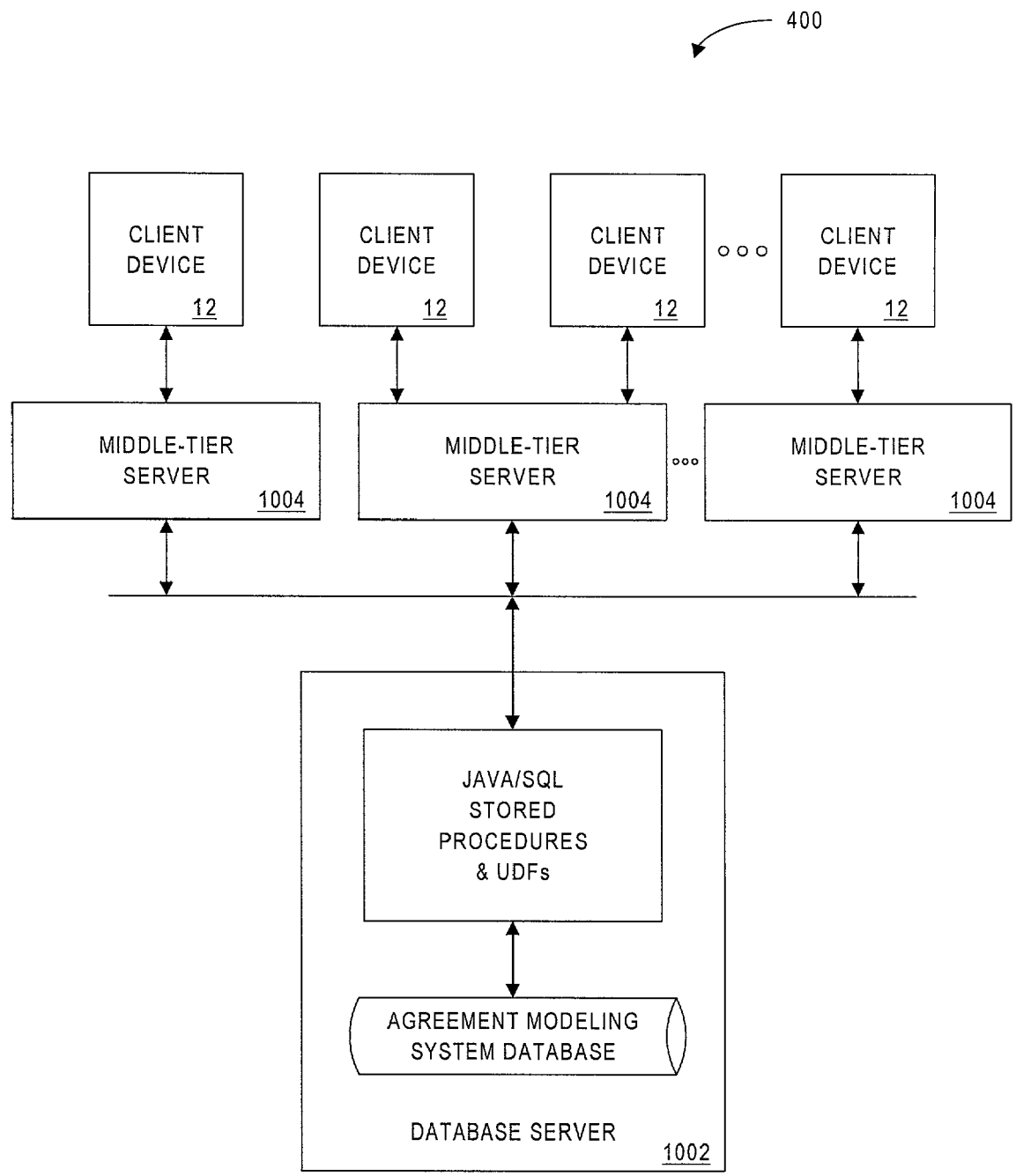
FIG. 4 is a client-server diagram overview of an agreement modeling system according to some embodiments of the present invention.

FIG. 4 is a client-server diagram overview of an agreement modeling system 400 according to some embodiments of the present invention. As shown in FIG. 4, a database server 1002 communicates with a number of middle-tier servers 1004. In turn, each middle-tier server 1004 communicates with one or more client devices 12.

The database server 1002 may include (or communicate with) an agreement modeling system database, such as a database that stores agreement information. The database server 1002 may also include Java and Structured Query Language (SQL) stored procedures along with User Defined Functions (UDFs). The database server 1002 can act as a "back-end" to the agreement modeling system 400 and manage user connections (e.g., by invoking stored procedures in and out, validating client logons, establishing client access rights, and/or maintaining a list of connected clients). The database server 1002 may also perform concurrency management (e.g., by responding to client timeout or disconnect notifications from middle-tier servers 1004, releasing check-out locks, updating access modes, and managing access modes and check-out locks on agreements, facts, or fact sets as described, for example, with respect to FIG. 6). In addition, the database server 1002 may manage Extensible Markup Language (XML) and Application Program Interface (API) information (e.g., by managing special Java XML API entry point stored procedures, interpreting incoming XML streams, performing appropriate XML operations, returning appropriate response XML packets, and/or retrieving agreement information using XML streams).

The middle-tier servers 1004 may comprise, for example, SILVERSTREAM® or WEBLOGIC® servers that manage user connections (e.g., via special login and logout servlet interfaces and/or by establishing logins and logouts with the database server 1002). The middle-tier servers 1004 may also perform session management (e.g., by handling timeouts and disconnects and notifying the database server 1002 when a client device 12 has timed-out or disconnects) and/or manage database connections (e.g., by optimizing and pooling database connections and providing XML user and session identification packets associated with XML packets sent to the database server 1002). The middle-tier servers 1004 may also perform XML API management (e.g., using a special XML API servlet interface that serves as a pass-through for XML packets sent to the database server 1002 via calls to a Java stored procedure).

A client device 12 may, for example, control user functionality (e.g., by supporting applicable user interactions). The client device 12 may also perform session management (e.g., by providing user login and logout capability, managing a physical connection including a connection status notification to a user, and issuing a logout when appropriate) and manage XML API interactions (e.g., by interacting with an XML API back-end via correctly formed XML packets, and/or managing incoming XML API response packets returned from XML API calls).

This hierarchical arrangement (e.g., having a client tier, a middle tier, and a database tier) may let a significant number of client devices 12 access and utilize the database server 1002.

Figure 5:
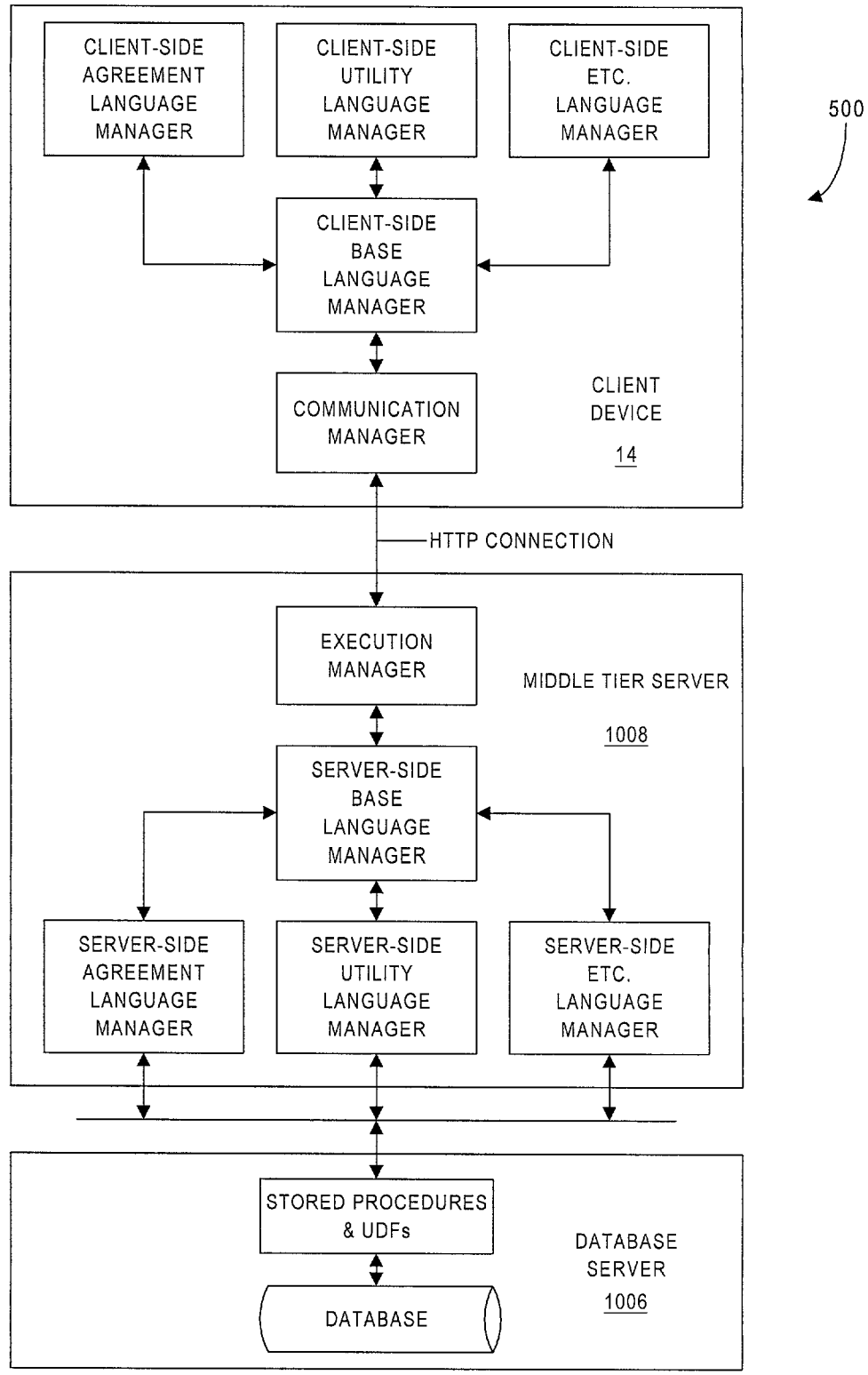
FIG. 5 is a more detailed diagram of an agreement modeling system according to an embodiment of the present invention.

FIG. 5 is a more detailed diagram of an agreement modeling system 500 according to one embodiment of the present invention. As shown in FIG. 5, a database server 1006 communicates with a middle-tier server 1008. In turn, the middle-tier server 1008 communicates with a client device 14.

The database server 1006 may, for example, provide support for an API via stored procedures and UDFs. The database server 1006 may also manage persistence of agreement information and API states for the agreement modeling system 500 in a database.

The middle-tier server 1008 may communicate with the database server 1006 via a number of server-side language managers, such as an agreement and/or a utility language manager. The server-side language managers may, for example, implement interfaces similar to those provided on the client side to provide specific API functionality. These managers may be registered with an execution manager indicating supported interfaces. Instances of the server-side language managers may be instantiated to service incoming API method calls. The managers may also provide implementation of the API method calls by interacting directly with the agreement database via stored procedure calls.

The server-side language managers may communicate with the execution manager via a server-side base language manager that routes method calls and provides implementation of common API methods.

The execution manager may exchange information with a communication manager associated with the client device 14 via a Hyper-Text Transfer Protocol (HTTP) connection. In addition, the execution manager may be delegated to by middle-tier servlets that process HTTP requests and responses. The execution manager may also handle all incoming API "method calls" and interact with the service-side base language manager to service those calls. Moreover, the execution manager may be responsible for the registration of server-side language managers, "de-serializing" XML method call packets, routing methods to the appropriate registered server-side language manager, "serializing" return values or errors into XML packets, and/or forwarding return values or errors back to the client device via an HTTP response.

The communication manager in the client device 14 interacts with a client-side base language manager and the middle-tier servlets. The communication manager is responsible for managing the connection with the server, the invocation of method calls by passing a stream to the server, the receiving return values or errors back as a stream, and/or propagating up return values or errors to the language manager layer. Both synchronous and asynchronous method calls may be supported at this layer.

The client-side base language manager may define a base class from which extended client-side language managers are derived. Common functionality may be implemented in the base class, including a standard set of API method calls. The client-side base language manager may also be responsible for interacting with the communication manager to process method calls forwarded by derived client-side language managers.

The client side base language manager communicates with a number of client-side language managers, such as an agreement and/or a utility language manager. The client-side language managers may implement interfaces providing specific API functionality to the client device 14. The API methods in the client application may be called like any other local method. The derived client-side language managers may be responsible for serializing method calls into XML packets and/or interacting with the client-side base language manager to process the call.

Agreement Modeling System Information Architecture

In order to define an agreement, the facts that are associated with the agreement need to be captured. However, different agreements may not be equal in terms of data content, and thus a flexible database design (e.g., capable of capturing a variety of data while maintaining relative data context) may be required to allow for effective and reliable agreement definition, generation, and/or utilization (e.g., via agreement information data queries).

Figure 6:
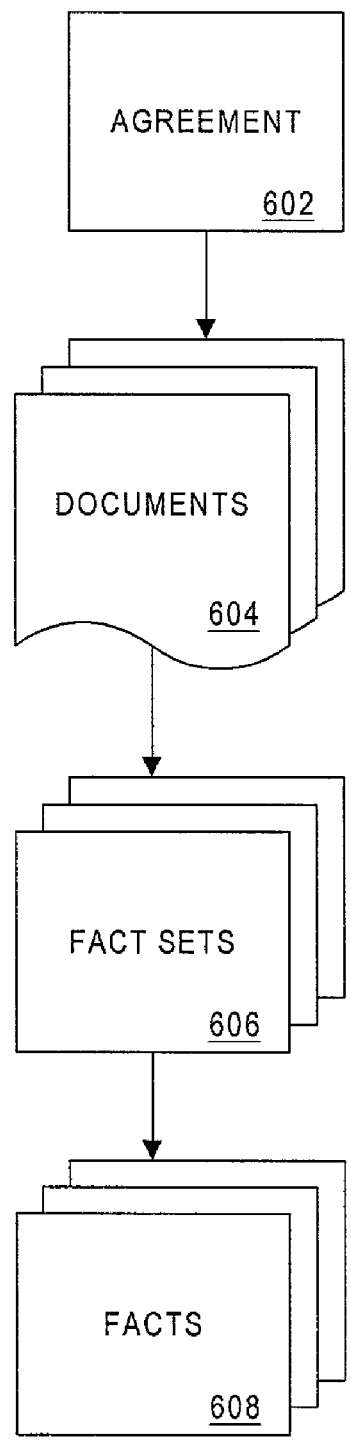
FIG. 6 is an information architecture overview associated with an agreement modeling system according to some embodiments of the present invention.

To achieve this end, the agreement modeling system may utilize a modeling language by which agreement content and context can be described without re-coding the database. FIG. 6 is an information architecture overview associated with one such -embodiment of the present invention. As can be seen in FIG. 6, the information architecture is associated with a hierarchical view of agreement information. In particular, an agreement 602 is viewed as a set of related documents 604. Each document 604 comprises one or more fact sets 606, and each fact set 606 includes a number of related facts 608 (e.g., single pieces of information). Thus, the information architecture may apply structure to information through the constructive use of well-known fact sets 606 and data definitions that are applied to facts 608, and taken together, data context may be maintained.

According to one embodiment, the agreement 602 is associated with an "original" document instance containing facts 608 that define the agreement 602 upon creation. As additional information is created (e.g., the original agreement 602 is amended), additional documents 604 may be added to define the facts 608 that apply at particular points in time.

For example, a document 604 may be created that "overrides" existing facts 608 in an agreement 602 for a specified period of time and/or that adds new facts 608 that extend existing facts 608. In either case, the added document 604 may now be considered to determine a complete set of agreement facts 608 (e.g., via an agreement modeling system query).

According to one embodiment, documents 604 may be categorized according to a single document type name and any number of document type facts that further refine the documents classification. By way of example, the document type name may indicate a basic category of agreement types (e.g., a financial instrument swap agreement or an over-the-counter financial instrument agreement) and the document type fact (or facts) may further categorize a document's relationship to an agreement (e.g., a credit support annex or an amendment to an existing agreement 602).

A document 604 contains instances of fact sets 606, and a fact 608 may belong to an instance of a fact set 606. Fact set definitions (in addition to document definitions) may exist outside of any agreement, and their definition and fact content may be described via an agreement modeling language.

By way of example, a fact 608 may be associated with a party name, a party address, a term date, a country of origin, an indication of governing law (e.g., "Delaware law applies to all transactions associated with this agreement"), or any other information associated with an agreement. A fact set 606 may comprise, for example, a counter-party fact set including a counter-party name and address.

Note that fact sets 606 can be single-instance or multi-instance. In either case, a fact 608 belonging to a fact set 606 may be related to the other facts 608 in that fact set 606. A multi-instance fact set 606 enables the repeated instantiation of the same set of facts 608, typically with different values being associated with the different instantiated facts 608. An instance of a multi-instance fact 606 set is analogous to a row of data in a conventional database table, and the facts 608 are analogous to columns. Note, however, that the table is not statically defined—rather it is dynamically defined via the agreement modeling language.

A fact 608 in the agreement modeling system may have pre-defined attributes that describe the fact's nature and meaning. For example, each fact 608 may have an associated data type that defines a set of potential values and/or data input behavior. A fact 608 may be considered "internal" or "external," and external facts may map to information in other databases (i.e. external databases). In addition, other attributes may be applied to facts 608 to help to define context.

Figure 7:
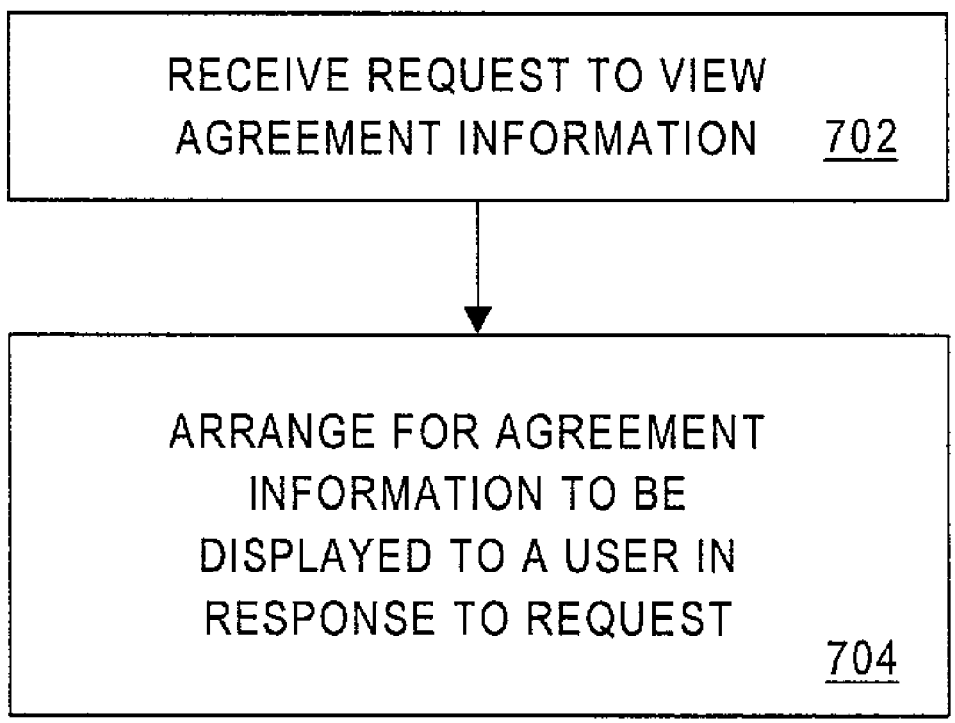
FIG. 7 is a flow chart of a method for displaying agreement information according to some embodiments of the present invention.

FIG. 7 is a flow chart of a method for displaying agreement information according to some embodiments of the present invention. At 702 a request to view agreement information is received. For example, the agreement modeling system controller 1000 may receive a request to view an agreement, a document, or a fact set from the client device 10.

Figure 8:
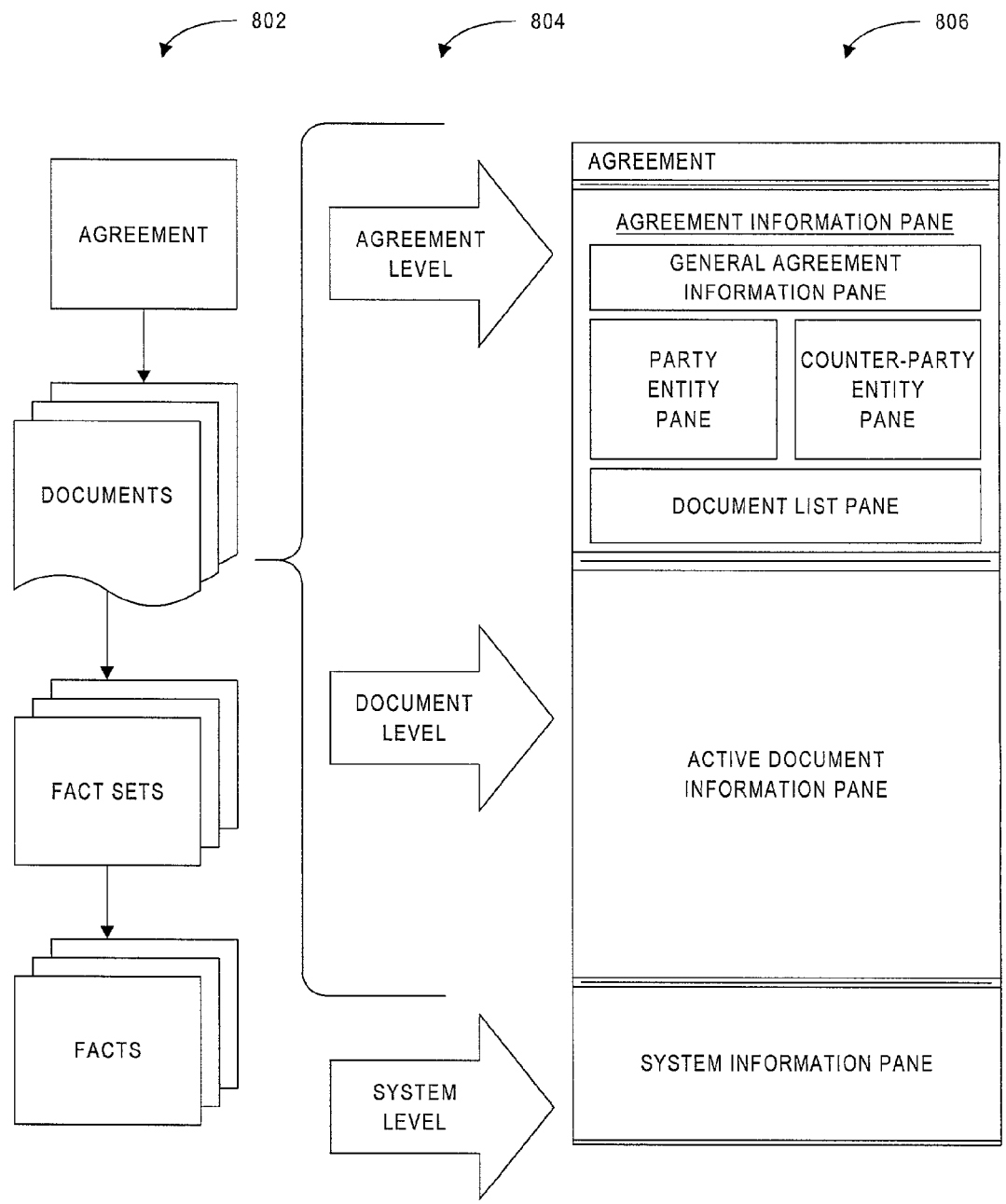
FIG. 8 illustrates various representations of agreement modeling system information according to an embodiment of the present invention.

At 704, it is arranged for the agreement information to be displayed to a user in response to the request. For example, FIG. 8 illustrates various representations of agreement modeling system information according to an embodiment of the present invention. To provide flexibility, agreement information may be stored via an extensible agreement modeling system language. For example, an XML or Standard Generalized Markup Language (SGML) data format may be used to store information as follows:

```
<Agreement>
    <Document>
        <Fact set>
            <Fact>
            </Fact>
              . . .
        </Fact set>
          . . .
    </Document>
      . . .
</Agreement>
```

Such an approach may let the system model dynamic information (e.g., document and fact set information) and facilitate communication of dynamic agreement information between a client and a server. In addition, the implementation may be technology neutral (e.g., the information may be provided to or accessed by a number of different technologies). Moreover, facts may be associated with attribute information, such as a data name, a data prompt, a data type, a security attribute, and/or a display attribute.

The relationships between an information architecture 802, an XML representation 804, and a display 806 are illustrated in FIG. 8. For example, document level information may be mapped to a particular XML representation (e.g. <Document spec="ORIGINAL|MASTER" id="2" . . . >, which in turn may be rendered by an agreement application display engine (e.g., via a document list pane and/or an active document information pane).

Agreement Modeling System Operation

Figure 9:
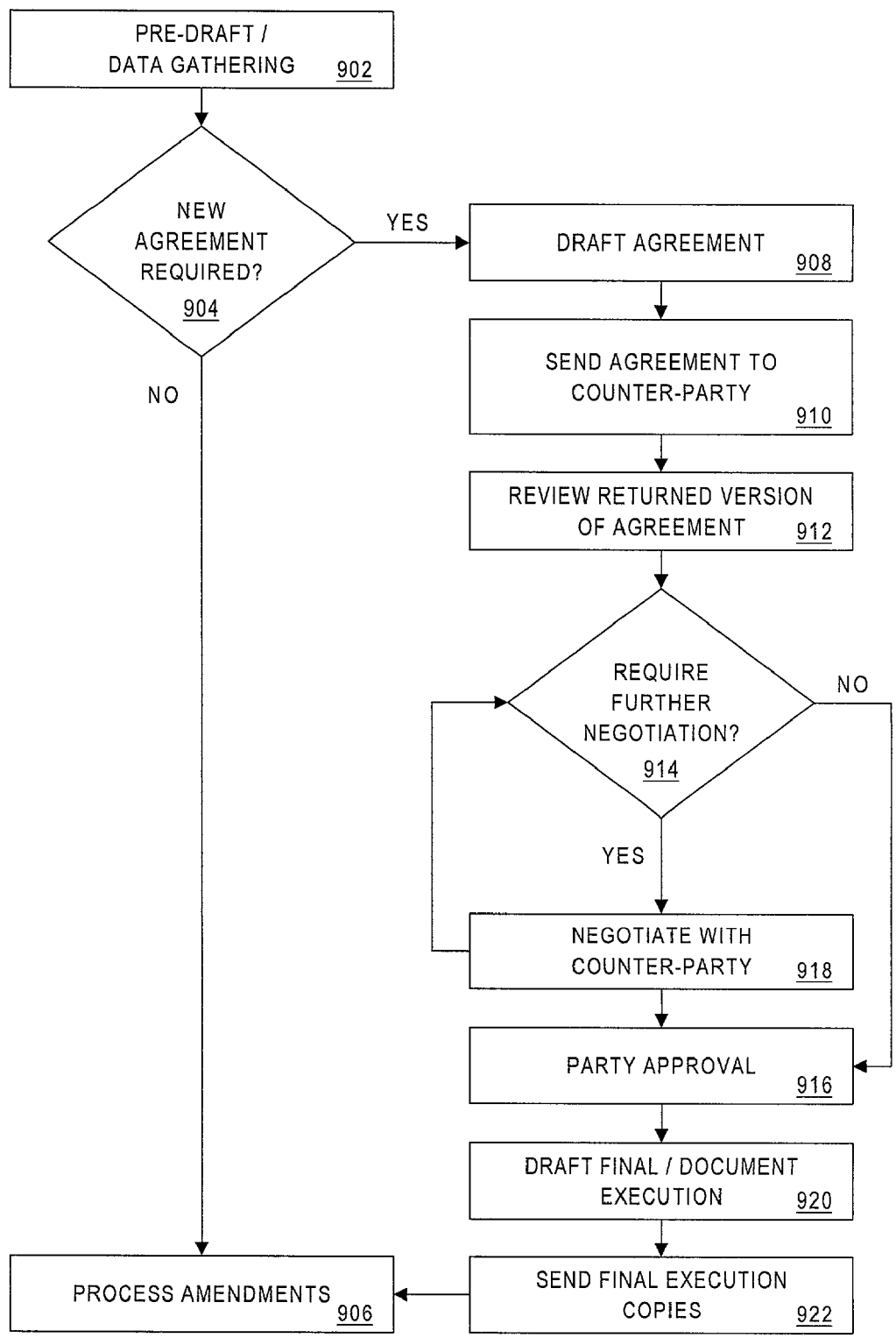
FIG. 9 is a flow chart of an agreement modeling system method according to some embodiments of the present invention.

FIG. 9 is a flow chart of a method according to some embodiments of the present invention. At 902, information associated with an agreement is gathered. For example, the agreement modeling system controller 1000 may gather information associated with a financial transaction agreement between a party and a counter-party via one or more client devices 10 and/or satellite systems.

At 904, it is determined if a new agreement is required. According to one embodiment, a request for a new agreement may be generated by a satellite system, such as the business system 30, the credit system 60, and/or the treasury system 70.

By way of example, a user associated with the business system 30 may populate a new agreement request form via a Web-based interface provided by the agreement modeling system 1000. The new agreement request form may include, for example, a set of "required" information, such as: a name of a sales person covering an account, a selected entity master (e.g., via a drop-down list of party entities that the counter-party is contemplating doing business with), a selected list of entities (e.g., via a drop-down list of parties and counter-parties), a business desk (e.g., an indication of "Fixed Income," "Equity," or "Commodities" which may be automatically generated based on a user identifier), a counter-party legal name (e.g., selected from a drop-down list), contact information of a person with whom documentation will be exchanged (e.g., a name, a phone number, and/or a facsimile number), one or more products to be traded (e.g., associated with a covered products matrix), an indication of whether or not the agreement is bilateral (e.g., two-way agreements may require special processing via the treasury system 70), an anticipated trade date, an indication of whether or not the agreement will be used as a marketing tool.

The new agreement request form may also include information that will be required when appropriate (e.g., based on the particular agreement being requested), such as a type of agreement (e.g., selected from a drop-down list) and/or an investment advisor. The new agreement request form may also include optional information, such as an electronic mail address associated with the counter-party.

As indicated above, some information may be selected by a user via a drop-down list (e.g., a counter-party name or identifier). In some cases, however, the desired information may not be present in the drop-down list (e.g., when a new counter-party is desired). In this case, a user may be asked to complete another form (e.g., a new counter-party request form) or he or she may simply enter the information manually (e.g., via free form text). Also note that one or more satellite systems may be involved in this process (e.g., the compliance system 50 may approve new counter-parties).

After the new agreement request form is submitted by the user, the agreement modeling system controller 1000 determines if a new agreement is actually required at 904. For example, the agreement modeling system controller 1000 may execute a query to ensure that there are no other existing agreements in place and return the results of the query to the user (e.g., by indicating that "there are existing agreements that cover this request"). If no new agreement is required at 904 (e.g., an appropriate existing agreement is found by the agreement modeling system controller 1000), one or more amendments to the existing agreement may be facilitated at 906. For example, the agreement modeling system controller 1000 or the compliance system 50 may determine that an existing agreement can be used to cover a transaction by broadening a compliance covered products scope term in the existing agreement. In this case, an electronic mail message may be transmitted to the legal system 40 asking if the agreement scope can be broadened accordingly. The legal system 40 may then indicate to the business system 30 that the transaction can be covered under the existing agreement. On the other hand, the legal system 40 may instead indicate that an amendment to the existing agreement is required.

In this case, the agreement modeling system controller 1000 may receive a request to amend an existing transaction agreement between a party and a counter-party. The request may be received, for example, from a user, a satellite system, or even a counter-party. Based on the request, an adjustment to a set of financial products, a set of financial instruments, a monetary amount, and/or an agreement date may then be determined (e.g., an agreement term that was to expire on Jan. 1, 2002 may be extended until Jul. 1, 2002). The agreement modeling system controller 1000 may then automatically determine adjusted agreement information in accordance with the adjustment and/or generate an amendment document in accordance with the adjusted agreement information. According to one embodiment, the adjusted agreement information is determined in accordance with a covered products matrix (as described in detail with respect to FIGS. 15 through 17). The adjusted agreement information may also comprise, for example, a new agreement term based on a pre-stored default transaction term (e.g., representing an industry "best practices" term).

If a new agreement is required at 904 (e.g., no appropriate existing agreement is found by the agreement modeling system controller 1000), the new agreement request form is processed by the agreement modeling system controller 1000. According to one embodiment, the processing of the new agreement request form also involves one or more satellite systems. For example, the compliance system 50 may receive the request via an automated workflow and provide information as required. In this case, the compliance system 50 may advise the legal system 40 as to the types of products the counter-party is authorized to trade, and with which party entity the counter-party may trade these products.

To make such a decision, the compliance system 50 may need to access information about the agreement, such as the counter-party name or identifier, a master agreement type, a current status of the master agreement type, a date of agreement, a document identifier, an investment advisor, and/or a security agreement type.

In addition to accessing information, the compliance system 50 may define facts for the agreement, such as: a compliance officer name responsible for the account, a party entity approved for the business, a covered products matrix indicating the authorized products the counter-party can or can't trade, and/or one or more supporting authority documents.

When the compliance system 50 finishes providing information, the form may be forwarded to the credit system 60 (e.g., if the agreement is associated with a risk transaction) to provide still more information. Such information may include, for example, collateral terms such as: a credit officer name responsible for the account, terms of a collateral agreement (e.g., bilateral, party post, or counter-party post), an independent amount (e.g., an initial margin percentage or dollar amount associated with notional amount), a threshold amount (e.g., a trigger value associated with a specified dollar amount or a ratings table), a minimum transfer amount, a rounding amount, and/or a base currency.

The credit system 60 may also provide non-collateral terms, such as: default information (e.g., bankruptcy information or credit event upon merger information), a cross acceleration threshold amount for the counter-party, and/or one or more credit-related additional termination events (e.g., adequate assurance, amendment of constituent documents, break clause, credit rating downgrade, decline in partners capital, governmental moratorium on debt declared, investment advisor event, material adverse change, modification to guaranty, net asset value information, ownership maintenance, redemption of notes, termination of trust under trust agreement, termination rights linked to separate agreement, transactions not covered by guaranty and/or guarantor, or withdrawal of general partners or key employees).

The credit system 60 may also indicate one or more credit support documents referenced under the agreement, such as: a comfort letter, a deed poll guarantee, an indemnity agreement, a Keepwell agreement, a letter of commitment, a letter of credit, a security trust deed, a senior facility agreement, a supplemental trust deed, a support agreement, and/or a swap surety bond/insurance policy.

In addition to the credit system 60, the treasury system 70 may provide information associated with bilateral agreements, such as an indication of approval, a threshold amount, a notional amount, eligible collateral types (e.g., United States Treasury bills, highly liquid pools, AAA bonds, residuals, commercial paper, investment grade corporate instruments, preferred stock, municipals, emerging market debt, Brady bonds, high yields, non-distressed issues, distressed issues, bank debt, whole loans, residential, commercial, and/or short-term mortgage backed bank notes), equities (e.g., United States or United Kingdom listed equities, foreign convertibles-investment grade, foreign convertibles-high yield, listed mutual funds, rights and warrants, or options), commodities (e.g., metals or energy), interest paid on cash collateral, base currency on Hicash, tri-party custodial relationships, notification time, amendments to transfer provision (e.g., after approval by the legal system 40).

According to one embodiment, the processing of multiple new agreement request forms may be prioritized (e.g., based on a date on which a request was made, a date associated with a pending trade, or a number of requests in a queue for a given business area).

Referring again to FIG. 9, after it is determined at 904 that a new agreement is needed, an agreement is drafted by the agreement modeling system controller 1000 at 908. For example, the agreement modeling system controller 1000 may use a rule set to route the new agreement request form to an appropriate functional group within the legal system 40 based on a product type and/or a party entity. Moreover, an agreement type (e.g., an ISDA® master agreement schedule, a club letter, or a credit support annex in accordance with New York law) may be determined based on one or more rules by the legal system 40 or the business system 30. According to one embodiment, a user has the ability to override an agreement type chosen by the system.

According to some embodiments, the legal system 40 can access the generated agreement on-line to review the agreement's structure and to make revisions, if required. The legal system 40 may also prepare the agreement for transmission. If desired, the legal system 40 may be prevented from changing or over-riding data that was originally provided via the new agreement request form.

The agreement modeling system controller 1000 may then automatically generate the agreement and, according to one embodiment, any supporting documents that accompany the agreement (e.g., a power of attorney, a legal opinion, a pre-executed request guarantee, and/or a cover letter).

The user or the agreement modeling system controller 1000 then forwards the agreement to the counter-party at 910. For example, a user may manually print hard copies of the agreement to send via a delivery service (e.g., FED EX®). According to another embodiment, the agreement modeling system controller 1000 sends a facsimile or an electronic message attachment of the agreement in an unalterable format (e.g., a "pdf" file) to the counter-party. In this case, the system may also provide the user with an automated notification that the document has been successfully transmitted. According to another embodiment, the agreement is published via a Uniform Resource Locator (URL) address that enables the counter-party to securely view the agreement.

According to one embodiment, the agreement modeling system controller 1000 instead determines that an agreement will not be automatically generated. This may be the case, for example, when a data field in the new agreement request form requires a change (e.g., a name change or a policy change). Similarly, it may be determined that a counter-party form of the agreement will be used, that supervisory review is required (e.g., based on a functional group associated with the agreement), or that the business system 30 has asked that the generation or transmission be postponed.

The counter-party may the respond to the draft agreement (e.g., by proposing changes to the draft agreement). For example, the counter-party may return a hard copy of an altered agreement. In this case, the hard copy may be scanned and stored via an Optical Character Recognition (OCR) application. The counter-party may instead contact the party via telephone to verbally confirm the terms of the agreement or advise of any discrepancies between the counter-party's view and party's view of the agreement. In this case, the agreement modeling system controller 1000 may store the name of the person who called and the time, date, and substance of the conversation.

Any changes proposed by the counter-party are then reviewed at 912. For example, discrepancies may be determined and routed to the appropriate party entities for reconciliation (e.g., by routing the information to an appropriate information owner based on a functional group or a document type).

If the changes proposed by the counter-party do not require further negotiation at 914 (or the counter-party has simply approved the draft agreement), the system waits for approval by the party at 916. If the changes proposed by the counter-party do require further negotiation at 914, negotiations continue until the differences are resolved at 918.

When both the counter-party and the party (including any entities associated with the party) have approved the agreement, a final execution document is prepared at 920 and sent to the appropriate parties for execution at 922. For example, two hard copies of a fully negotiated ISDA® schedule and boiler-plate may be printed and forwarded to the counter-party for signature. In addition, a cover letter with instructions to the counter-party may be automatically generated along with any required tax documents.

The counter-party can then return the signed agreement via hard copy, electronic mail, facsimile, or a URL, together with any supporting documentation (e.g., a power of attorney). The date that the agreement was executed may be recorded by the agreement modeling system controller 1000 along with, for example, a date on which the agreement is effective (which may or may not be the same as the execution date). Any subsequent amendments to the agreement may then be made at 906.

Agreement Modeling System Controller

Figure 10:
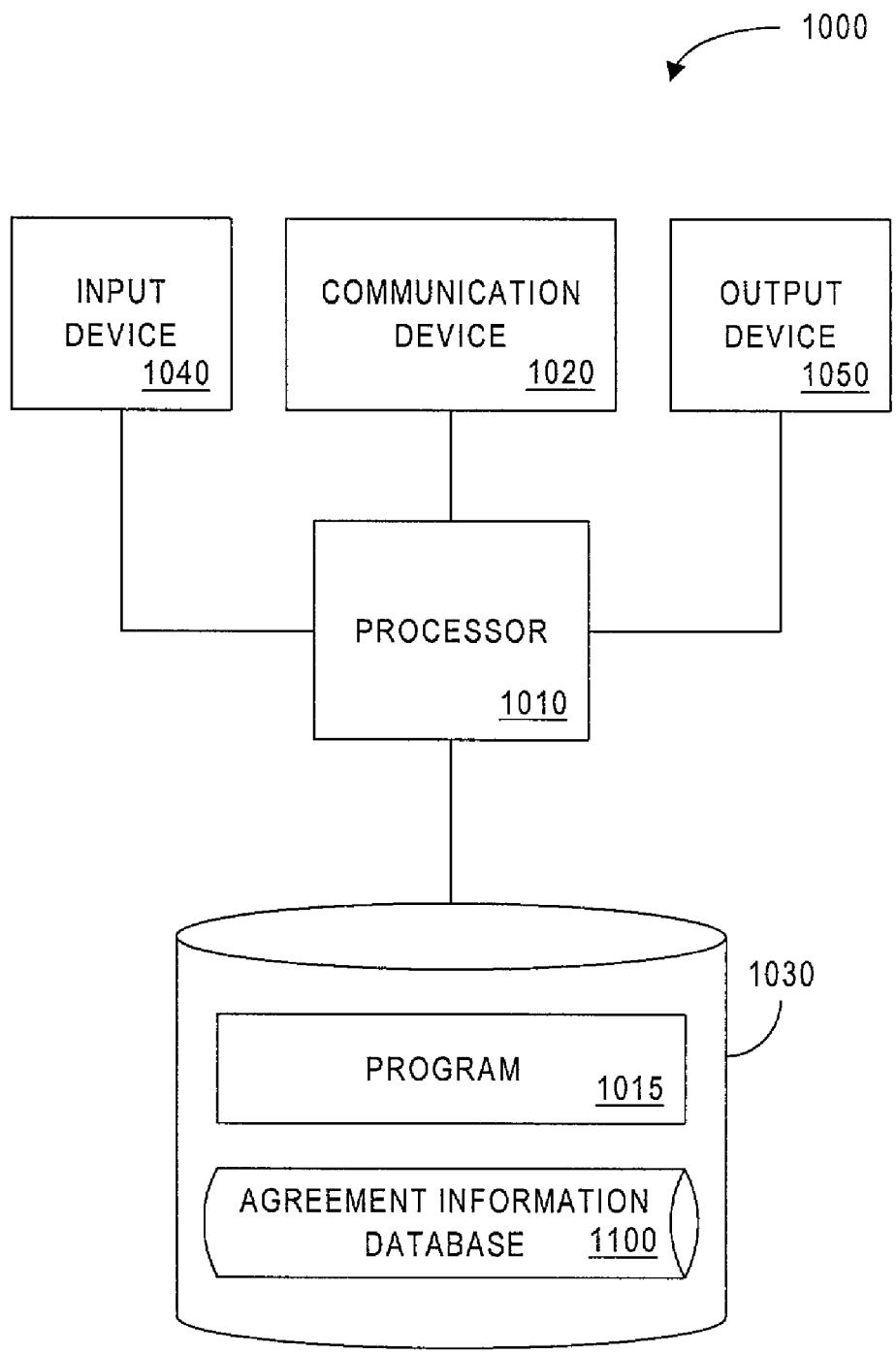
FIG. 10 is a block diagram of an agreement modeling system controller according to an embodiment of the present invention.

FIG. 10 illustrates an agreement modeling system controller 1000 that is descriptive of the devices shown, for example, in FIGS. 1 and 3 according to some embodiments of the present invention. The agreement modeling system controller 1000 comprises a processor 1010, such as one or more INTEL® Pentium® processors, coupled to a communication device 1020 configured to communicate via a communication network (not shown in FIG. 10). The communication device 1020 may be used to communicate, for example, with one or more client devices 10 and/or satellite devices.

The processor 1010 is also in communication with an input device 1040. The input device 1040 may comprise, for example, a keyboard, a mouse or other pointing device, a microphone, knob or a switch, an IR port, a docking station, and/or a touch screen. Such an input device 1040 may be used, for example, to enter information (e.g., agreement query information).

The processor 1010 is also in communication with an output device 1050. The output device 1050 may comprise, for example, a display (e.g., a display screen), a speaker, and/or a printer. The output device 1050 may be used, for example, to output agreement information (e.g., a final version of an agreement to be executed or a date on which a particular agreement became effective).

The processor 1010 is also in communication with a storage device 1030. The storage device 1030 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1030 stores a program 1015 for controlling the processor 1010. The processor 1010 performs instructions of the program 1015, and thereby operates in accordance with the present invention. For example, the processor 1010 may receive transaction information associated with a transaction. The processor 1010 may then determine agreement information and evaluate the transaction information and the agreement information. Based on this evaluation, the processor 1010 may also generate an indication (e.g., to a user or to a satellite system).

According to another embodiment, the processor 1010 receives financial transaction information indicating a financial product, a financial instrument, and/or a monetary amount. The processor then determines agreement information associated with a covered products matrix and evaluates the financial transaction information and the agreement information. Based on this evaluation, the processor 1010 may transmit an indication of approval (or disapproval) to a user and/or a satellite system, such as an indication that an agreement is approved for use with respect to a given transaction.

According to another embodiment, the processor 1010 receives an indication of an agreement between a party and a counter-party, the agreement including an agreement term associated with a term date. The processor 1010 also receives an indication of a query date and determines an applicability of the agreement term on the query date based on the term date.

According to another embodiment, the processor 1010 receives a request to access agreement information associated with an agreement between a party and a counter-party. The processor 1010 determines if the request will be approved based on security information associated with the agreement information, and (if the request is approved) arranges to enable access to the agreement information.

According to another embodiment, the processor 1010 arranges for a first user to access agreement information associated with an agreement between a party and a counter-party. The processor 1010 then receives from a second user a request to access the agreement information, but prevents the second user from accessing the agreement information based on the first user's access.

According to still another embodiment, the processor 1010 receives a request to amend an existing transaction agreement between a party and a counter-party. The processor 1010 then determines an adjustment to a set of financial products, a set of financial instruments, a monetary amount, and/or an agreement date. The processor 1010 also automatically determines adjusted agreement information in accordance with the adjustment.

According to yet another embodiment, the processor 1010 receives agreement information from a first user, and generates an agreement document in accordance with the agreement information. The processor 1010 then receives transaction information (e.g., from a second user), and evaluates the transaction information based on the agreement information.

The storage device 1030 also stores an agreement information database 1100. The illustration and accompanying description of this database is exemplary, and any number of other database arrangements could be employed besides those suggested by the figure.

Referring to FIG. 11, a table represents the agreement information database 1100 according to one embodiment of the present invention. The table includes entries identifying agreement information. The table also defines 1102, 1104, 1106, 1108, 1110 for each of the entries. In particular, the table defines an agreement information identifier 1102, an information type 1104, an entry date 1106, an effective date 1108, and an expiration date 1110. The information in the agreement information database 1100 may be created and updated, for example, by the agreement modeling system controller 1000, a client device 10, and/or a satellite device.

The agreement information identifier 1102 may be, for example, an alphanumeric code associated with an agreement term (e.g., an agreement, a document, a fact set, or a fact). The information type 1104 describes the agreement information. For example, the agreement information may comprise an original master agreement or an amendment to an existing master agreement.

The agreement information database 1100 also stores one or more term dates associated with the agreement information. For example, the entry date 1106 indicates when the agreement information was stored in the database. Other term dates indicate a period during which a particular agreement term applies. For example, an agreement term may apply from the effective date 1108 to the expiration date 1110. Note that the effective date 1108 may be prior to (or after) the entry date 1106 associated with an agreement term.

Agreement Modeling System Time Perspective

Figure 12:
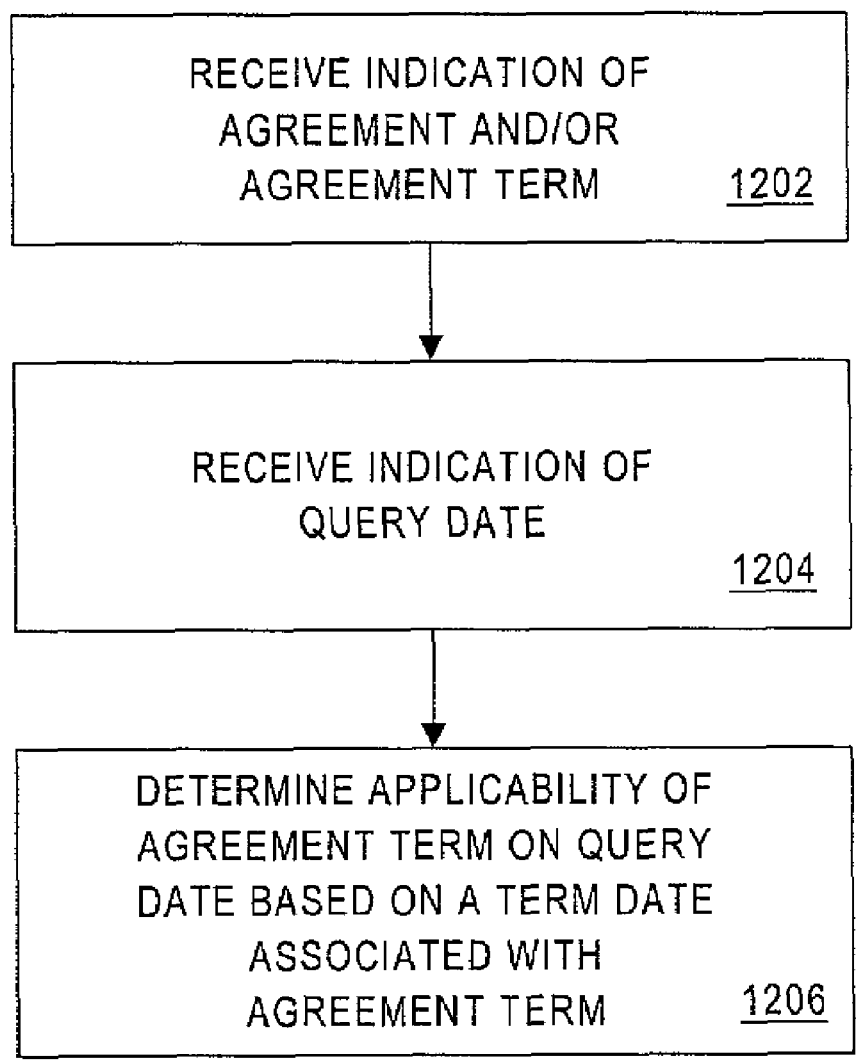
FIG. 12 is a flow chart of a method for utilizing agreement time perspective according to some embodiments of the present invention.

FIG. 12 is a flow chart of a method for utilizing agreement time perspective according to some embodiments of the present invention. At 1202, an indication of an agreement and/or an agreement term is received. Consider, for example, a user who wants to determine if a proposed transaction is covered by an existing agreement. In this case, the user may select the existing agreement from a list, and an identifier associated with the agreement may be transmitted from the client device 10 to the agreement modeling system controller 1000. The indication received at 1202 may come from, for example, a user or a satellite system and may include an agreement identifier, a document identifier, a party entity identifier, a counter-party identifier, a financial instrument identifier, and/or a financial product identifier.

At 1204, an indication of a query date is received. For example, a user may indicate that he or she wants to determine the state of the agreement as it existed on a particular day. According to one embodiment, the query date is merely the current date (e.g., the user is interested in the current state of the agreement).

At 1206, an applicability of an agreement term on the query date is determined. For example, the agreement modeling system controller 1000 may retrieve one or more term dates from the agreement information database 1100 (e.g., an entry date 1106, an effective date 1108, and/or an expiration date 1 1 10). The term date and the query date may then be compared to determine if the agreement term is (or was) applicable on the query date.

Figure 13:
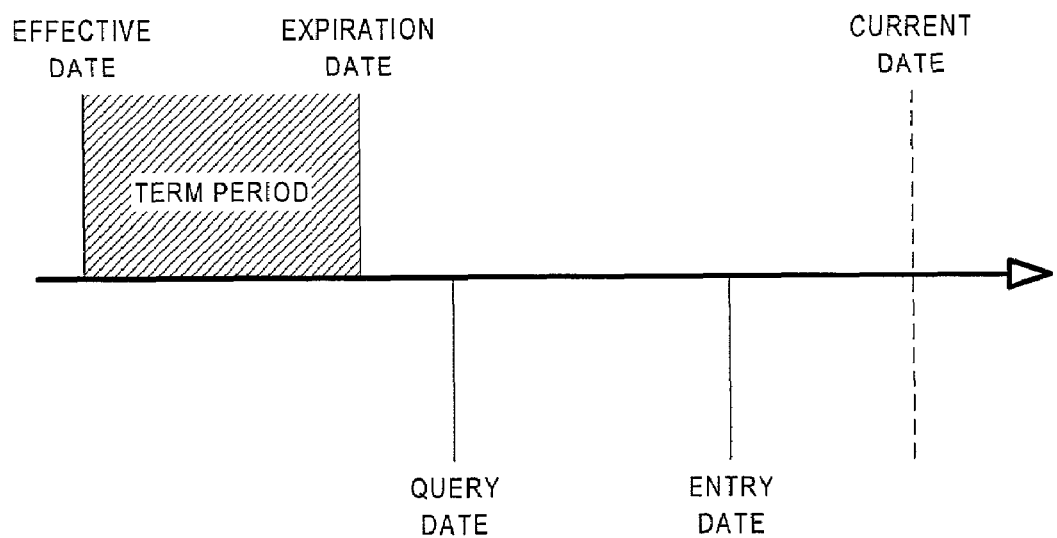
FIG. 13 illustrates agreement time perspective according to one embodiment of the present invention.

As illustrated in FIG. 13, the term date may be associated with a term period during which the agreement term is applicable. The term date may be, for example, an effective date after which the agreement term is applicable or an expiration date after which the agreement term is not applicable. The term date may also be a term period (e.g., indicating that the agreement term is to be applicable for one year from a date on which an agreement document was signed). The term date may also be an entry date (e.g., a date on which information about the agreement term was entered into the agreement modeling system 100). Note that information about an agreement term may be entered into the agreement modeling system 100 (i.e., on the entry date) after the agreement term has expired (i. e., the expiration date). Similarly, an entry date may be prior to the effective date of the agreement term. Of course, the entry date may also fall between the effective date and the expiration date.

Referring again to FIG. 12, after the agreement modeling system controller 1000 determines the applicability of the agreement term at 1206, an indication of applicability may be provided to the user or satellite system (e.g., the user may be told that a transaction that occurred on a particular day was not in fact covered by the selected agreement). According to one embodiment, the agreement modeling system controller 1000 also provides an indication of at least one supporting agreement document (e.g., a pointer, a word processing file, or an electronic image file associated with a supporting agreement document). For example, a link may be displayed to let a user quickly access an agreement document that defines the agreement term and/or the term date.

FIG. 14 is an agreement time perspective display according to some embodiments of the present invention. The display includes a list 1402 of documents associated with an agreement (i.e., an original agreement document and two amendment documents). The display also includes details 1404 of the facts that were included in each agreement document (e.g., facts "A" though "E"). As can be seen, the first amendment document (i.e., document number "124") changed fact "B" from "no" to "yes" and fact "C" from "unknown" to "no." The display also includes a time perspective summary 1406 indicating the status of the agreement at various points in time (from the perspective of Mar. 2, 1999).

Consider now fact "E" shown in FIG. 14. The original agreement set fact "E" to "yes" as of Jan. 1, 1998. The first amendment did not change fact "E" and the second amendment changed fact "E" from "yes" to "no." Although the second amendment was executed on Mar. 1, 1999, it had a retroactive effective date of Jan. 1, 1998. Thus, the value of fact "E" on Feb. 1, 1998 viewed from the perspective of Feb. 28, 1999 would be "yes" (i.e., because the second amendment had not been executed at that point). In contrast, the value of fact "E" on Feb. 1, 1998 viewed from the perspective of Mar. 2, 1999 would be "no" (i.e., because the second amendment had been executed at that point as illustrated in FIG. 14). Note that the date associated with the time perspective summary 1406 may be, for example, the current date or a date in the past.

Agreement Modeling System Covered Products Matrix

Figure 15:
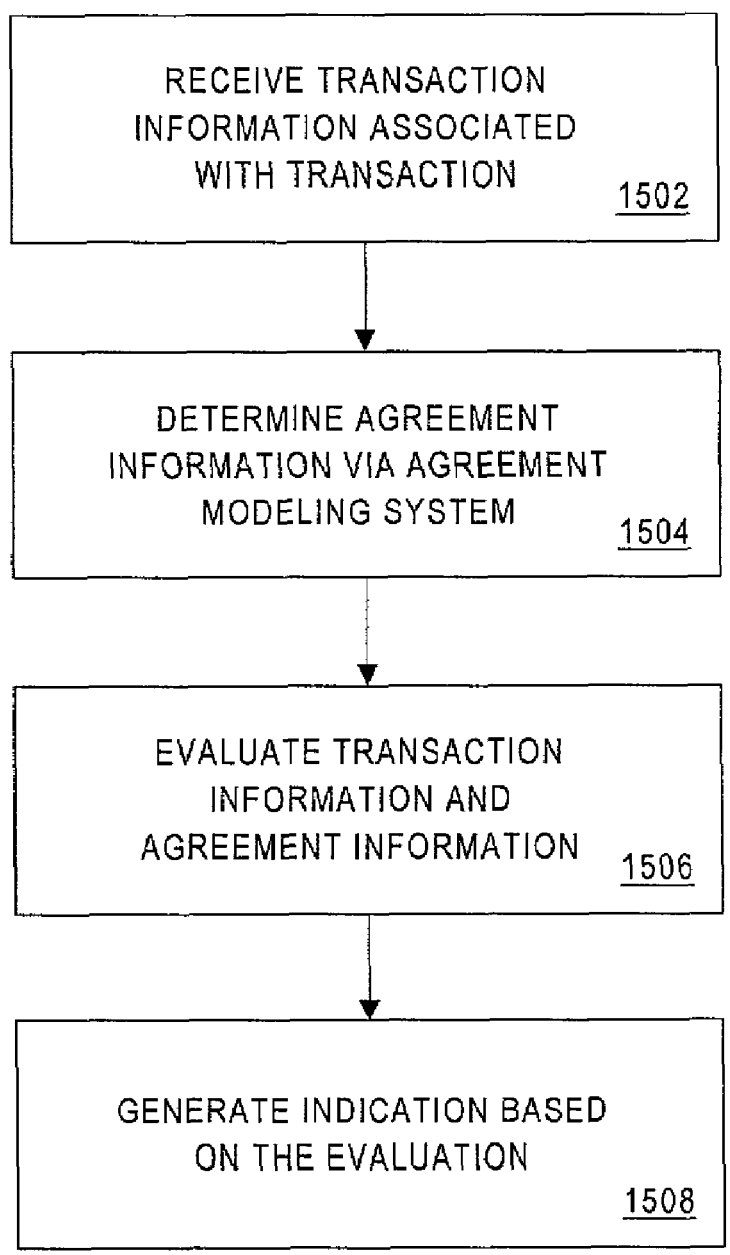
FIG. 15 is a flow chart of a method to evaluate transaction information according to some embodiments of the present invention.

FIG. 15 is a flow chart of a method to evaluate transaction information according to some embodiments of the present invention. The method may be performed, for example, by the agreement modeling system controller 1000 and may be associated with a transaction agreement defining a plurality of product types (e.g., a number of different financial products) and instruments (e.g., a number of different financial instruments).

At 1502, transaction information associated with a transaction is received. For example, the agreement modeling system controller 1000 may receive transaction information from a user (or a satellite system) including an agreement identifier, a document identifier, a party entity identifier, a counter-party identifier, a financial instrument identifier, a financial product identifier, a transaction date, and/or a monetary amount. Note that the transaction may be a proposed transaction (i.e., a pending transaction) or a previously completed transaction. Moreover, this method may be performed on a transaction-by-transaction basis or on a batch of transactions (e.g., at the end of each month).

The agreement modeling system controller 1000 then determines agreement information associated with the transaction at 1504. According to one embodiment, the agreement information is associated with a "covered products matrix." As used herein, the phrase "covered products matrix" may refer to, for example, any stored indication of transaction instruments (e.g., swaps, options, and forwards) and product types (e.g., stocks, bonds, and credit derivatives) in connection with a particular agreement. Note that the stored information does not necessarily need to be in the form of a matrix or an array.

One example of a covered products matrix is illustrated in FIG. 16. As shown in FIG. 16, an agreement may be associated with a number of different financial products. For example, an agreement may be associated with an equity instrument (e.g., a stock or index instrument), a fixed income instrument (e.g., a bond, a bank loan, or a credit derivative), and/or a commodity instrument (e.g., a precious metals instrument or a wheat commodity instrument). For each financial product, the agreement may further be associated with one or more financial instruments (e.g., a warrant or a buy-call option). The covered products matrix indicates that the agreement is currently associated with (i) buy and sell options for gold commodities and (ii) swaps for silver commodities (i.e., as indicated as "Y" in FIG. 16).

As another example, consider the covered products matrix illustrated in FIG. 17. As can be seen, this agreement is associated with (i) swaps and options for metal commodities and (ii) options for energy commodities.

In general, the covered product matrix may be associated with any number of product types, such as equity products, stock products, index products, fixed income products, bond products, bank loan products, whole loan products, interest rate products, credit derivative products, commodity products, metal products, energy products, agriculture products, and/or any other type of product. Similarly, the covered product matrix may be associated with any number of transaction instruments, such as swap instruments, option instruments, buy instruments, sell instruments, call instruments, put instruments, forward instruments, pre-paid forward instruments, spot instruments, repurchase agreement instruments, loan instruments, warrant instruments, a contract for differences instrument, and/or any other type of instrument.

Moreover, the covered products matrix may indicate when a particular financial instrument is approved (or disapproved) with respect to an agreement between a party and a counter-party. Also note that the covered products matrix may indicate if either of these items are "under investigation" (e.g., approval or disapproval is pending) or "not contemplated" (e.g., by the party or the counter-party). Similarly, the covered products matrix may indicate compliance authorization information, default information, party or counter-party information, legal information, and/or master agreement information.

The covered products matrix may set the scope of a particular agreement between a party and a counter-party. From a compliance system 50 perspective, an individual covered products matrix may exist for each "entity pair" (i.e., a party—counter-party pair). From a legal system 40 perspective, a covered products matrix may exist for each agreement, and there may be multiple covered product matrices for a single entity pair. In this case, the agreement modeling system controller 1000 may ensure that this does not result in over-lapping coverage.

According to one embodiment, there are multiple layers of information associated with each intersection in the covered products matrix. For example, there may be an "authorized scope" layer that captures approval of the compliance system 50 regarding which products a given counter-party is allowed to trade. According to one embodiment, when the compliance system 50 indicates an authorized scope, the agreement modeling system controller 1000 defaults certain products to "no" based on a pre-defined rule. For example, if a new authorized scope entry is created for a particular counter-party, the agreement modeling system controller 1000 may default all foreign exchange products to "no" since the compliance system 50 does not typically approve foreign exchange products with that particular counter-party. According to one embodiment, an operator may override these default determinations.

Based on authority documents and other relevant information, the compliance system 50 may mark appropriate products with a "yes," indicating that those products may be traded with the counter-party. The compliance system 50 may also have the ability to mark products with a "no" (indicating disapproval) or "in progress" indicating that the product is in the process of being considered. All other boxes may remain blank indicating that the product has not been (and is not being) considered.

With respect to the legal system 40, there may also be a "document scope" layer that captures a range of products that could possibly be covered by a master agreement (e.g., according to a court of law). According to one embodiment, when a new master agreement is created, the agreement modeling system controller 1000 uses a default document scope if the agreement type in question is always limited to a certain subset of products. A user may also over-ride these default values.

There may also be an "approved scope" layer that captures the products for which legal system 40 would like to use a given master agreement. For example, the legal system 40 may define for each master agreement a set of trades for which that master agreement should be used. This set of trades may be a subset of the document scope, and the document scope may therefore be defined before the approved scope. According to one embodiment, the approved scope is limited to a subset of the authorized scope.

Referring again to FIG. 15, the transaction information and the agreement information are evaluated at 1506. For example, the agreement modeling system controller 1000 may determine if a particular financial product can be sold to a particular counter-party in accordance with a covered product matrix. At 1508, an indication is generated based on the evaluation performed at 1506. The indication may comprise, for example, an indication of approval, an indication of non-approval, an indication that further evaluation is required, and/or an indication that an amendment to an existing agreement is required. The indication may then be transmitted to a user (or a satellite system).

Agreement Modeling System Security

Figure 18:
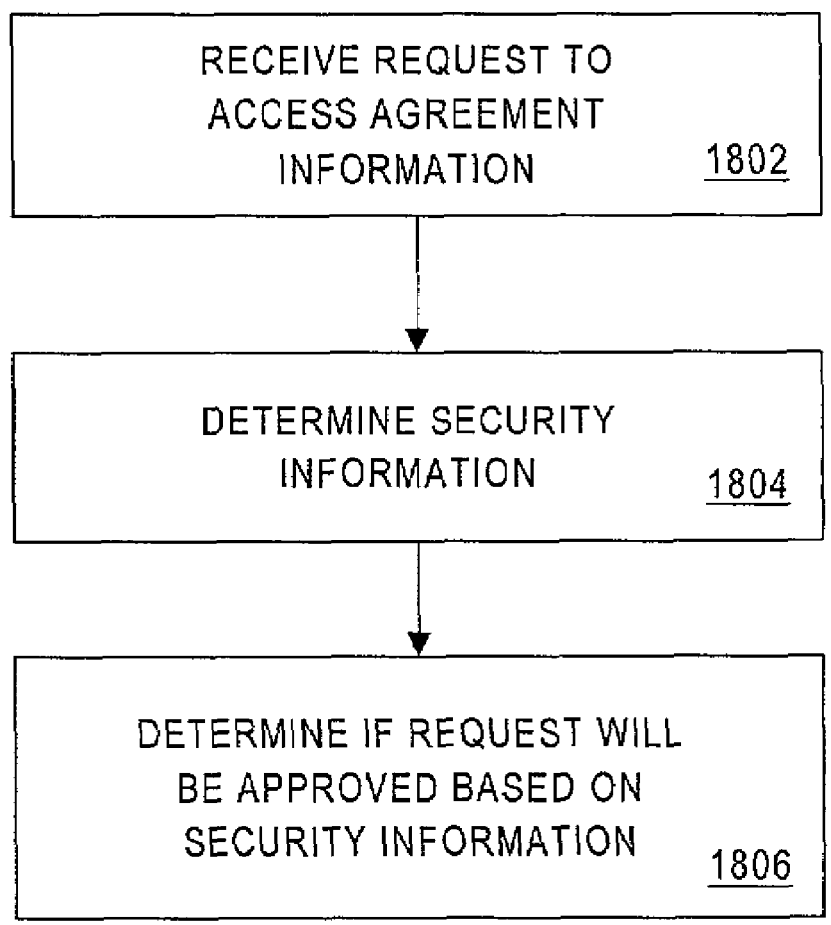
FIG. 18 is a flow chart of an agreement modeling system security method according to some embodiments of the present invention.

FIG. 18 is a flow chart of an agreement modeling system security method according to some embodiments of the present invention. At 1802, the agreement modeling system controller 1000 receives a request to access agreement information associated with an agreement between a party and a counter-party. The request may be received from, for example, a user (or a satellite system) and may include an agreement identifier, a document identifier, a fact set identifier, a fact identifier, a user identifier (e.g., indicating that the request is from a user in a legal department), a party entity identifier, and/or a counter-party identifier.

The request to "access" the agreement information may simply be a request to view the agreement information. The request may instead be a request to edit or change the agreement information. According to one embodiment, the request instead seeks permission to "use" the agreement information (e.g., when executing a program that determines if a proposed transaction is covered by an agreement).

At 1804, the agreement modeling system controller 1000 determines security information associated with the request. The security information may also be associated with the user (or satellite system) associated with the request. The security information may indicate, for example, a security class, a fact level security attribute, an agreement level security attribute, ownership of the agreement information, an access scope, a security group, an access mode, a user access level, and/or a security rule.

The security information lets the agreement modeling system controller 1000 determine who is allowed to access agreement information (and the ways in which the information may be accessed). According to one embodiment, two levels of security are maintained: (i) agreement/document and wizard level security and (ii) fact level security. The agreement/document level security may control broad access to agreements and/or documents and determine the types of actions (e.g., creating, updating, and deleting) that can be applied to agreements and/or documents. On the other hand, fact level security may be applied once agreement/document access is obtained, and may control access to individual facts in the system.

In particular, the agreement/document and wizard level security may determine which existing agreements and associated documents can be accessed by a user, and which agreements/documents the user can create or delete. This level may be further divided into two parts: (i) access to the wizard pages that enable creation of agreements (initial entries into the agreement modeling system) and (ii) the capability to create, access, and delete agreements/documents. Initially, agreement creation may be controlled by limiting a user's access to wizard pages. This lets agreement creation be partitioned into high-level categories that dictate which underlying agreement types can possibly be created by a user.

Fact level security may control access to each instance of a fact in the agreement modeling system. For example, each fact instance in the system may be associated with a pre-defined security class having several attributes, such as a description, an ownership map (e.g., indicating a set of functional areas that own the data), and an access scope indicator.

FIGS. 19A and 19B illustrate a security class attribute table according to an embodiment of the present invention. Note that a "T" indicates ownership and a blank indicates a lack of ownership. As can be seen, three different access scopes are included in the table: public, private, and confidential. These access scopes define an implicit hierarchy of increasing data sensitivity, with "public" being the least sensitive and "confidential" is the most sensitive. Each security class is associated with a single access scope.

According to this embodiment, fact level security may be associated with data ownership (or responsibility) by functional areas or entities within an enterprise. For example, ownership may typically be associated with the functional area that originates and controls data content of a fact. Note that ownership may not be related to where the data is persisted in a database. Also note that a single fact can be owned by more than one functional area at the same time. The following functional areas are illustrated in FIGS. 19A and 19B: legal, compliance, credit, EIG (Entity Information Group), treasury, operations, business desk, DMG (Document Management Group), and agreement modeling system (i.e., a systems administrator).

Fact level security access modes may be assigned to a user on a per functional area (and/or access scope) basis calculated based on his or her group membership. FIGS. 20A and 20B are a security group attribute table according to an embodiment of the present invention. As will be described, a "1" indicates "show" access, a "2" indicates "view" access, a "3" indicates "edit" access, and a blank indicates "no" access.

When "no" access is allowed, even the existence of a fact may not be apparent to a user. According to one embodiment, an "include" access level can also be established. In this case, the fact is included in the client side stream of data but both its prompt and value are not visible to the user.

When "show" access is allowed, the fact (i.e., the fact's prompt area on a display) is visible to the user. In this case, however, the fact's value is not visible (i.e. the user is aware the fact exists, but cannot view the fact's value).

When "view" access is allowed, both the fact and the associated value are visible to the user. In this case, the fact's value cannot be changed by the user. When "edit" access is allowed, the fact and the fact's value are visible to the user—and the fact's value can be changed. Note that other access modes may be incorporated as necessary (e.g., an "include" access mode may allow data to flow to the client from the database even when the data is not typically visible to the end-user).

Each user in the system may be associated with one or more pre-defined security groups, and each user's access capabilities may defined by computing the "greatest rights" via a union of all of the access rights inherited from every group of which the user is a member.

According to one embodiment, a security group has several attributes including a description, a set of agreement/document level security attributes, and a set of fact level security attributes. With respect to security groups and fact level security attributes, fact access may be driven by the ownership and the access scope inherited by a fact from its security class. For each security group, defined access modes may be associated with a functional area and an access scope.

A user's access to facts within may be determined by a union of all of the access modes of all of the security groups of which he or she is a member. The access mode for any particular functional area and access scope may be determined to be the "mode that provides the greatest access" in the relative functional area and access scope, in any of the security groups of which he or she is a member.

As an optimization for fact access, the complete set of access modes may be pre-computed for each user and retained as the user's runtime access attributes. In this case, a change to security group access settings, a user's group membership, or a security class may cause a recalculation of user fact access capability. FIG. 21 is a security user group membership table according to an embodiment of the present invention. Note that the that a "T" indicates membership and a blank indicates no membership.

The results of such a security optimization calculation may be stored by the agreement modeling system controller 1000. According to one embodiment, the calculation is performed via effective joins and intermediate result sets applied against underlying security tables. After the calculation is made, a further optimization may be (more directly) computed for each fact in the system based upon its static association to a security class, and the results stored by the agreement modeling system controller 1000. FIG. 22 is a security user computed-access (per security class) table according to an embodiment of the present invention. Note that a "1" indicates show access, a "2" indicates view access, a "3" indicates edit access, and a blank indicates no access.

According to one embodiment, the creation of security classes and security groups are performed as follows:

1. For each functional area plus access scope pair, one security class may be created (e.g., LEGAL_PUBLIC, LEGAL_PRIVATE, LEGAL_CONFIDENTIAL). The functional ownership associated with the class may be at least the functional area for which the class was created. If appropriate, additional ownership may be specified.
2. For each functional area, an administrative group may be created (e.g., LEGAL_ADMIN). The administrative group may be assigned full edit access mode rights across all access scopes within the relative functional area. If appropriate, additional access mode rights may be assigned.
3. For each functional area, a user group may be created (e.g., LEGAL_USER). The user group may be assigned full access mode rights to public access scope within the relative functional area. If appropriate, additional access mode rights may be assigned. Note that in the case of a system administration group, no SYSTEM_USER group may be needed.

Referring again to FIG. 18, the agreement modeling system controller 1000 determines at 1806 whether or not the request will be approved based on security information associated with the agreement information. If the request is approved, the agreement modeling system controller 1000 lets the user (or satellite system) access the agreement information. If the request is not approved, the agreement modeling system controller 1000 may transmit an indication to the user (or satellite system) associated with the request, such as "access denied—only the compliance department can edit this fact set."

Agreement Concurrency Management

Figure 23:
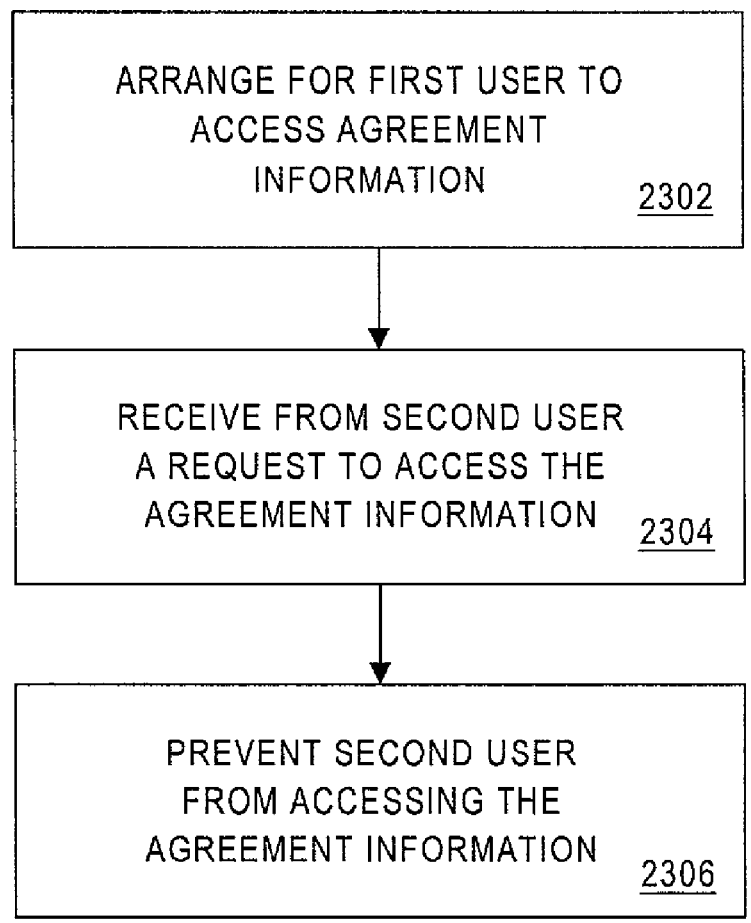
FIG. 23 is a flow chart of an agreement modeling system concurrency management method according to some embodiments of the present invention.

FIG. 23 is a flow chart of an agreement modeling system concurrency management method according to some embodiments of the present invention. At 2302, the agreement modeling system controller 1000 arranges for a first user to access agreement information associated with an agreement between a party and a counter-party. For example, a fact set may be accessed via a client device 10 or a satellite system. At 2304, the agreement modeling system controller 1000 receives from a second user a request to access the agreement information.

Based on the first user's access, the agreement modeling system controller 1000 may prevent the second user from accessing the agreement information at 2306. As will be explained with respect to FIGS. 24 through 26, the agreement modeling system controller 1000 may prevent the second user from accessing the agreement information based on agreement level concurrency, document level concurrency, fact set level concurrency, and/or fact level concurrency. For example, the prevention may be performed via an information lock associated with a document level check-in and check-out concurrency management process. Note that when the first user accesses a first fact set associated with the agreement, the second user may be allowed to access a second fact set associated with the agreement.

In general, the agreement modeling system architecture may partition agreement information into fact sets. For example, each individual instance of a fact set may be presented to a client as a "screen" of information. Edits applied to a client's fact set screen may be confirmed (e.g., via a "save" or "OK" dialog button) or dismissed (via a "cancel" dialog button). In this context, changes made to an agreement's content may be managed in a coordinated fashion to ensure that changes made by one user do not conflict with changes made by another user.

To achieve this goal, three levels of concurrency are implemented according to one embodiment: (i) agreement level concurrency, (ii) document level concurrency, and (iii) fact set level concurrency.

Agreement level concurrency may restrict edit access for an entire agreement to a single user (logged into a single session) at any point in time. Document level concurrency may restrict edit access for a specific document within an agreement to a single user (logged into a single session) at any point in time. Fact set level concurrency may restrict edit access for a specific fact set within an agreement (including all current and potential instances of the fact set) at any point in time.

According to one embodiment, the agreement modeling system controller 1000 implements a check-out/check-in scheme to facilitate concurrency management. In this case, a user may check-out either an entire agreement, a specific document within an agreement, or a specific fact set.

Figure 24:
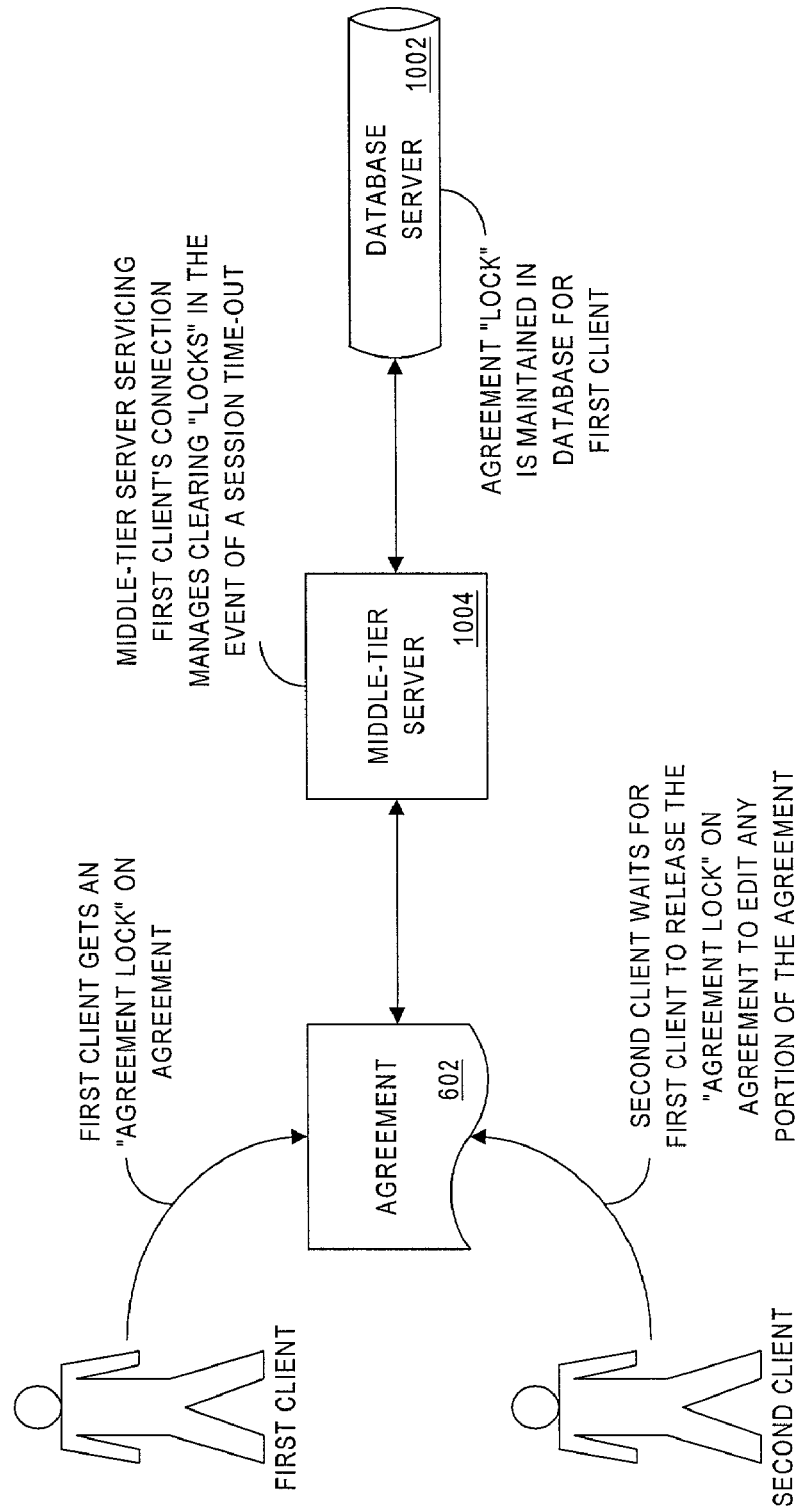
FIG. 24 illustrates agreement level concurrency management associated with a single middle-tier server according to an embodiment of the present invention.

FIG. 24 illustrates agreement level concurrency management associated with a single middle-tier server 1004 according to an embodiment of the present invention. Note that an entire agreement 602 is checked-out by a single user (e.g. the first client) at any point in time. As long as the agreement 602 is checked-out, then only that user can edit the agreement 602 (including all fact sets within the agreement 602). An agreement lock is maintained on the agreement 602 until the user checks-in the agreement 602 (e.g., via the database server 1002), and the lock prevents any other user (e.g., the second client) from making changes to the agreement 602. As a result, other users must wait until the agreement 602 is checked-in (and the agreement lock is released) before making changes to the agreement 602.

Figure 25:
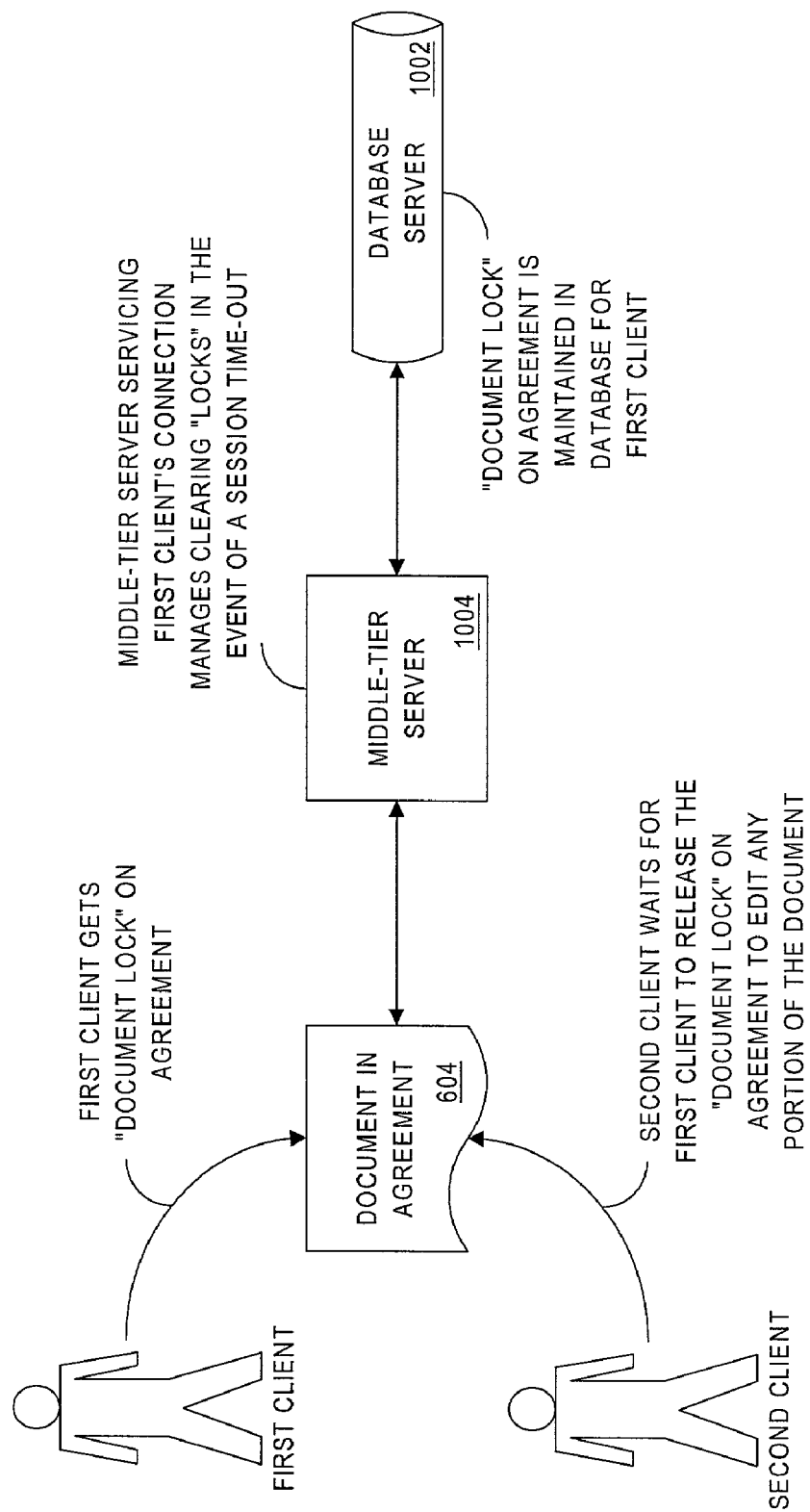
FIG. 25 illustrates document level concurrency management associated with a single middle-tier server according to an embodiment of the present invention.

FIG. 25 illustrates document level concurrency management associated with a single middle-tier server 1004 according to an embodiment of the present invention. Note that a specific (entire) document 604 is checked-out by a single user (e.g., the first client) at any point in time. As long as the document 604 is checked-out, then only that user can edit the document 604 (including all fact sets within the document 604). A document lock is maintained on the entire document 604 until the user checks-in the document 604 (e.g., via the database server 1002), and the lock prevents any other user (e.g., the second client) from making changes to the document 604. As a result, other users must wait until the document 604 is checked-in (and the document lock is released) before making changes to the document 604.

Figure 26:
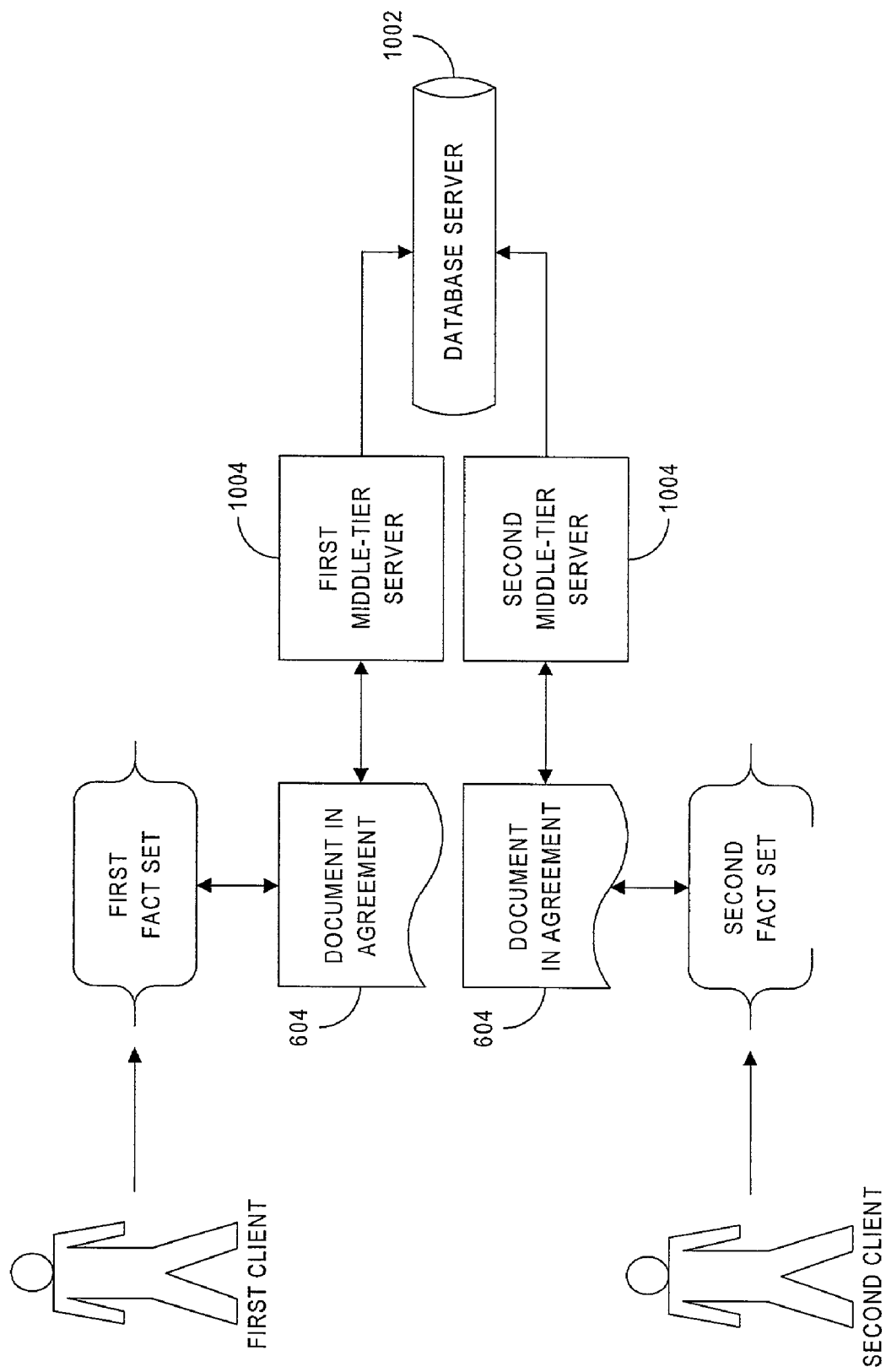
FIG. 26 illustrates fact set level concurrency management associated with multiple middle-tier servers according to an embodiment of the present invention.

FIG. 26 illustrates fact set level concurrency management associated with multiple middle-tier servers 1004 according to an embodiment of the present invention. Fact set level concurrency means that multiple users (e.g., the first and second clients) can simultaneously access different fact sets within a document 604 within an agreement. Each fact set may be checked-out by a single user at any point in time. As long as a user has a fact set checked-out, then only that user can edit the current and potential instances of the fact set. A fact set lock is maintained on the fact set (including all current and potential instances of the fact set) by the database server 1002 and/or a middle-tier server 1004 until the user checks-in the fact set, and the lock prevents other user from making changes to any instances of that fact set. As a result, other users must wait until the fact set is checked-in (and the fact set lock is released) before making changes to any instances of the fact set.

According to one embodiment, only one lock (of any type) is active by a given user against a specific agreement at any point in time. However, a user may have several locks active simultaneously, as long as they apply to different agreements.

In addition, locks may be automatically released by the system if the associated user's session times-out. Similarly, an administrative system control may allow a system administrator to manually release "active" locks. Note that the number of middle-tier servers 1004 involved may not impact the concurrency model (i.e., the concurrency model may effectively operate independent of the number of middle-tier servers 1004).

These three levels of concurrency (i.e., agreement, document, and fact set) may coexist simultaneously if the concurrency levels active for an agreement do not conflict with each other. To facilitate this, the agreement modeling system controller 1000 may also manage concurrency level integrity. For example, agreement level concurrency is incompatible with the other two concurrency levels. That is, if a user has an agreement checked-out with an agreement lock then (by definition) no one else can access the agreement. Similarly, document level concurrency is compatible with fact set level concurrency within the same agreement—so long as fact set locks and document locks are not being applied to the same document. Fact set level concurrency allows for the greatest concurrency due to the granularity of the access (i e., each fact set lock only restricts edit access by other users to a single fact set).

For a given agreement, the following locking rules may be enforced to ensure concurrency level integrity:

1. If a user has an agreement lock, then no one else can access the agreement and no other type of lock can be obtained.
2. If a user has a document lock or a fact set lock associated with an agreement, then an agreement lock cannot be obtained.
3. If a user has a document lock on a specific document within an agreement, then no one else can access the document. As a result, no other type of lock can be obtained associated with that document.
4. If a user has a fact set lock associated with a document (within an agreement), then a document lock cannot be obtained on that document and an agreement lock cannot be obtained. Also, another fact set level lock cannot be obtained on that specific fact set. Note that other fact set level locks may be obtained on different fact sets.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Many of the embodiments described herein include an agreement modeling system controller 1000 that facilitates definition of an agreement. According to other embodiments, however, some or all of these functions are instead performed by other devices. For example, multiple devices may communicate with each other to perform the functions described herein without the use of a "controller" (e.g., a peer-to-peer model may be used). Moreover, many of the devices illustrated in FIG. 3 (including some or all of the satellite systems) may be incorporated in a single device.

In addition, many of the embodiments described herein are directed to financial transaction agreements. However, the present invention is applicable to may other types of agreements as well (e.g., contracts with a governmental authority).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for utilizing an agreement modeling system, comprising:
    receiving, by an agreement modeling system, an indication of an agreement between a party and a counter-party, the agreement including an agreement term associated with a term date;
    receiving, by the agreement modeling system, subsequent to the receiving of the indication of the agreement, an indication of a retroactive modification to the agreement, wherein the retroactive modification to the agreement is associated with a modification date;
    storing, by the agreement modeling system, information indicative of the agreement term, information indicative of the term date, information indicative of the retroactive modification, and information indicative of the modification date;
    receiving, by the agreement modeling system, a query, wherein the query comprises an indication of a query date, the query date being a date other than the date on which the indication of the query date is received, and an indication of a transaction date associated with a transaction, wherein the transaction date is different than the query date;
    determining, by the agreement modeling system, an applicability of the agreement term with respect to the transaction, as of the query date, based at least in part on a comparison of the term date, the transaction date, the modification date, and the query date; and
    providing, by the agreement modeling system, and indication of the determination.

2. The method of claim 1, wherein the term date comprises at least one of: (i) a term effective date, (ii) a term expiration date, (iii) a term period, or (iv) a term entry date.

3. The method of claim 1, wherein the query date comprises a date indicated by a user.

4. The method of claim 1, wherein the indication of the agreement comprises at least one of: (i) an agreement identifier, (ii) a document identifier, (iii) a party entity identifier, (iv) a counter-party identifier, (v) a financial instrument identifier, or (vi) a financial product identifier.

5. The method of claim 1, wherein at least one of the receiving of the indication of the agreement, the receiving of the indication of the retroactive modification of the agreement, or the receiving of the query comprises receiving information from at least one of: (i) a user, or (ii) a satellite system.

6. The method of claim 1, wherein the providing comprising:
    transmitting an indication of the determination of the applicability of the agreement term with respect to the transaction, as of the query date, to at least one of: (i) a user, or (ii) a satellite system.

7. The method of claim 6, further comprising:
    transmitting an indication associated with a supporting agreement document.

8. The method of claim 1, further comprising:
    receiving, by the agreement modeling system, transaction information associated with the transaction and the agreement;
    identifying, by the agreement modeling system, agreement information associated with the agreement, wherein the agreement information is stored by the agreement modeling system;
    evaluating, by the agreement modeling system, the transaction information and the agreement information; and
    generating, by the agreement modeling system, an indication based on said evaluating.

9. The method of claim 8, wherein said receiving of the transaction information comprises receiving the transaction information from at least one of: (i) a user, or (ii) a satellite system.

10. The method of claim 9, wherein the satellite system comprises at least one of: (i) a business system, (ii) a legal system, (iii) a compliance system, (iv) a credit system, (v) a treasury system, or (vi) an operations system.

11. The method of claim 8, wherein the transaction information is associated with at least one of: (i) a party entity, (ii) a counter-party, (iii) the transaction date, (iv) an agreement date, (v) a financial product, (vi) a financial instrument, or (vii) a monetary amount.

12. The method of claim 11, wherein the financial product comprises at least one of: (i) an equity product, (ii) a stock product, (iii) an index product, (iv) a fixed income product, (v) a bond product, (vi) a bank loan product, (vii) a whole loan product, (viii) an interest rate product, (ix) a credit derivative product, (x) a commodity product, (xi) a metal product, (xii) a energy product, or (xiii) an agriculture product.

13. The method of claim 11, wherein the financial instrument comprises at least one of: (i) a swap instrument, (ii) an option instrument, (iii) a buy instrument, (iv) a sell instrument, (v) a call instrument, (vi) a put instrument, (vii) a forward instrument, (viii) a pre-paid forward instrument, (ix) a spot instrument, (x) a repurchase agreement instrument, (xi) a loan instrument, (xii) a warrant instrument, or (xiii) a contract for differences instrument.

14. The method of claim 8, wherein the agreement information is associated with a covered products matrix.

15. The method of claim 8, wherein the indication comprises at least one of: (i) an indication of approval, (ii) an indication of non-approval, (iii) an indication that further evaluation is required, or (iv) an indication that an amendment to an agreement is required.

16. The method of claim 8, wherein said generating comprises transmitting the indication to at least one of: (i) a user, or (ii) a satellite system.

17. The method of claim 8, wherein the transaction comprises at least one of: (i) a pending transaction, or (ii) a completed transaction.

18. The method of claim 8, wherein said evaluating is performed on at least one of: (i) a transaction basis, or (ii) a batch of transactions.

19. An apparatus for utilizing an agreement modeling system, comprising:
a processor; and
a storage device in communication with said processor and storing instructions adapted to be executed by said processor to:
receive an indication of an agreement between a party and a counter-party, the agreement including an agreement term associated with a term date;
receive, subsequent to the receiving of the indication of the agreement, an indication of a retroactive modification to the agreement, wherein the retroactive modification to the agreement is associated with a modification date;
store at least one of information indicative of the agreement term, information indicative of the term date, information indicative of the retroactive modification, or information indicative of the modification date;
receive a query, wherein the query comprises an indication of a query date, the query date being a date other than the date on which the indication of the query date is received, and an indication of a transaction date associated with a transaction, wherein the transaction date is different than the query date;
determine an applicability of the agreement term with respect to the transaction, as of the query date, based at least in part on a comparison of the term date, the transaction date, the modification date, and the query date; and
provide the determination of the applicability of the agreement term with respect to the transaction, as of the query date.

20. The apparatus of claim 19, wherein said storage device further stores an agreement information database.

21. The apparatus of claim 19, further comprising:
a communication device coupled to said processor and adapted to communicate with at least one of: (i) a client device, (ii) an agreement modeling system controller, (iii) a satellite system, or (iv) a counter-party device.

22. A medium storing instructions adapted to be executed by a processor to perform a method of utilizing an agreement modeling system, said method comprising:
receiving, by an agreement modeling system, an indication of an agreement between a party and a counter-party, the agreement including an agreement term associated with a term date;
receiving by the agreement modeling system, subsequent to the receiving of the indication of the agreement, an indication of a retroactive modification to the agreement, wherein the retroactive modification to the agreement is associated with a modification date;
storing, by the agreement modeling system, at least one of information indicative of the agreement term, information indicative of the term date, information indicative of the retroactive modification, or information indicative of the modification date;
receiving, by the agreement modeling system, a query, wherein the query comprises an indication of a query date, the query date being a date other than the date on which the indication of the query date is received, and an indication of a transaction date associated with a transaction, wherein the transaction date is different than the query date;
determining, by the agreement modeling system, an applicability of the agreement term with respect to the transaction, as of the query date, based at least in part on a comparison of the term date, the transaction date, the modification date, and the query date; and
providing, by the agreement modeling system, the determination of the applicability of the agreement term with respect to the transaction, as of the query date.

* * * * *